United States Patent [19]

Ackeret

[11] Patent Number: 5,800,004
[45] Date of Patent: Sep. 1, 1998

[54] STORAGE DEVICE, ESPECIALLY FOR UMBRELLAS, FOR INSTALLATION IN MOTOR VEHICLES

[75] Inventor: Peter Ackeret, Küsnacht, Switzerland

[73] Assignee: Fischerwerke, Artur Fischer GmbH & Co., KG, Waldachtal, Germany

[21] Appl. No.: 704,537

[22] PCT Filed: Mar. 17, 1995

[86] PCT No.: PCT/EP95/01000

§ 371 Date: Aug. 30, 1996

§ 102(e) Date: Aug. 30, 1996

[87] PCT Pub. No.: WO95/27634

PCT Pub. Date: Oct. 19, 1995

[30] Foreign Application Priority Data

Apr. 6, 1994 [CH] Switzerland ................ 993/94

[51] Int. Cl.⁶ .................................................. B60R 7/06
[52] U.S. Cl. ................... 296/37.13; 296/37.8; 224/915
[58] Field of Search ............................. 296/152, 154, 296/37.12, 37.13, 37.1, 37.8; 224/915, 544, 543, 549

[56] References Cited

U.S. PATENT DOCUMENTS

| 1,694,855 | 12/1928 | Irons | 296/37.13 |
| 3,081,126 | 3/1963 | Theberge | 296/37.13 X |
| 4,700,848 | 10/1987 | Fujiki et al. | 224/915 X |
| 4,807,920 | 2/1989 | Fujiki et al. | 296/37.13 X |

FOREIGN PATENT DOCUMENTS

| 3812571 | 10/1989 | Germany | 296/37.13 |

*Primary Examiner*—Joseph D. Pape
*Attorney, Agent, or Firm*—Michael J. Striker

[57] ABSTRACT

A storage device for umbrellas for installation in motor vehicles has a receiving compartment arranged in a vehicle door and an umbrella holder movably connected thereto for receiving an umbrella, the umbrella holder is movable between an inner end position in which it is enclosed in the receiving compartment and an outer end position in which it can be removed from the umbrella holder and inserted therein, a unit for moving the umbrella holder from the inner to the outer end position and formed so that the umbrella holder is moved under the action of a spring from the inner to the outer end position and is held securely in the receiving compartment against the force of the spring by a manual releaseable locking mechanism, and a unit is provided for moving the umbrella from the outer to the inner end position as the vehicle door closes and including a driver member arranged on the umbrella holder and also a stop arranged on the door sill.

40 Claims, 17 Drawing Sheets

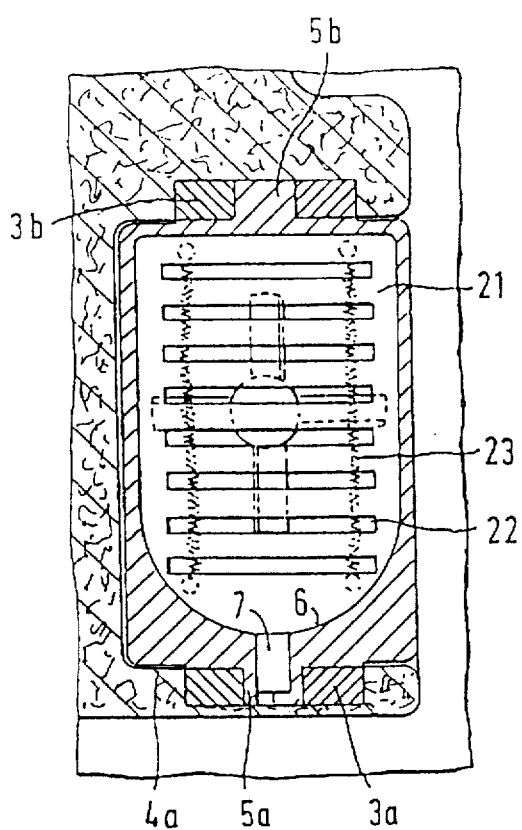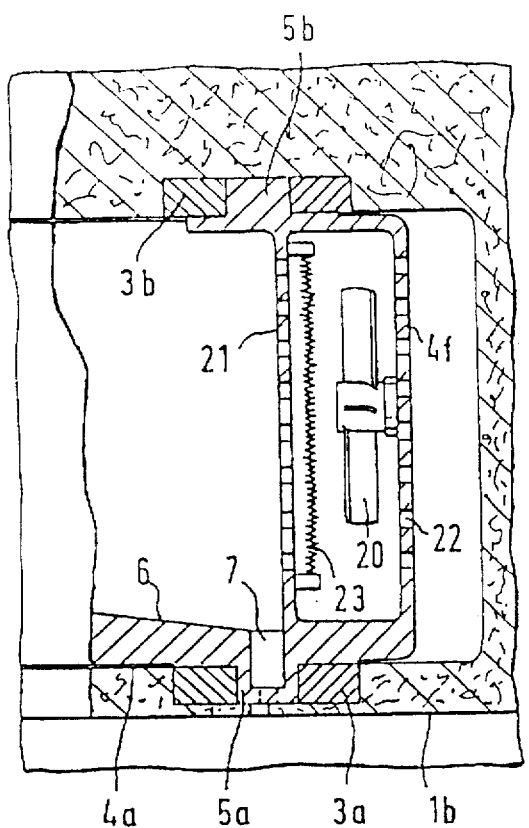
FIG. 5    FIG. 6
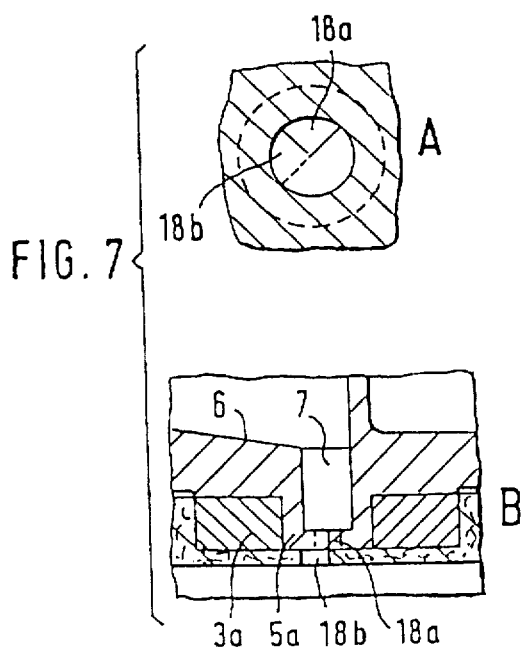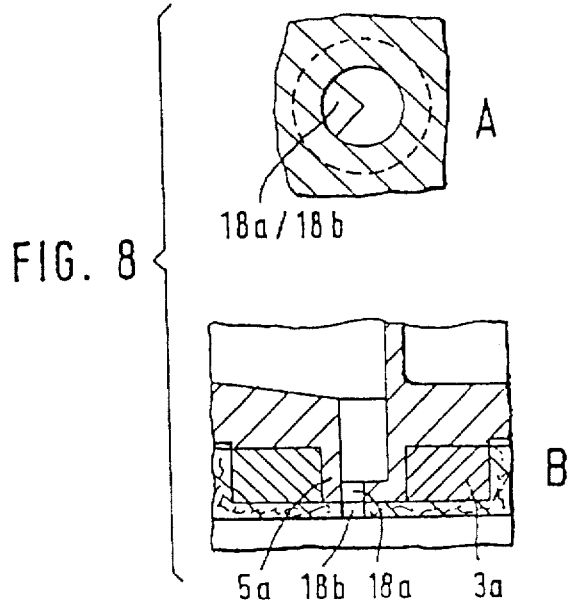
FIG. 7    FIG. 8

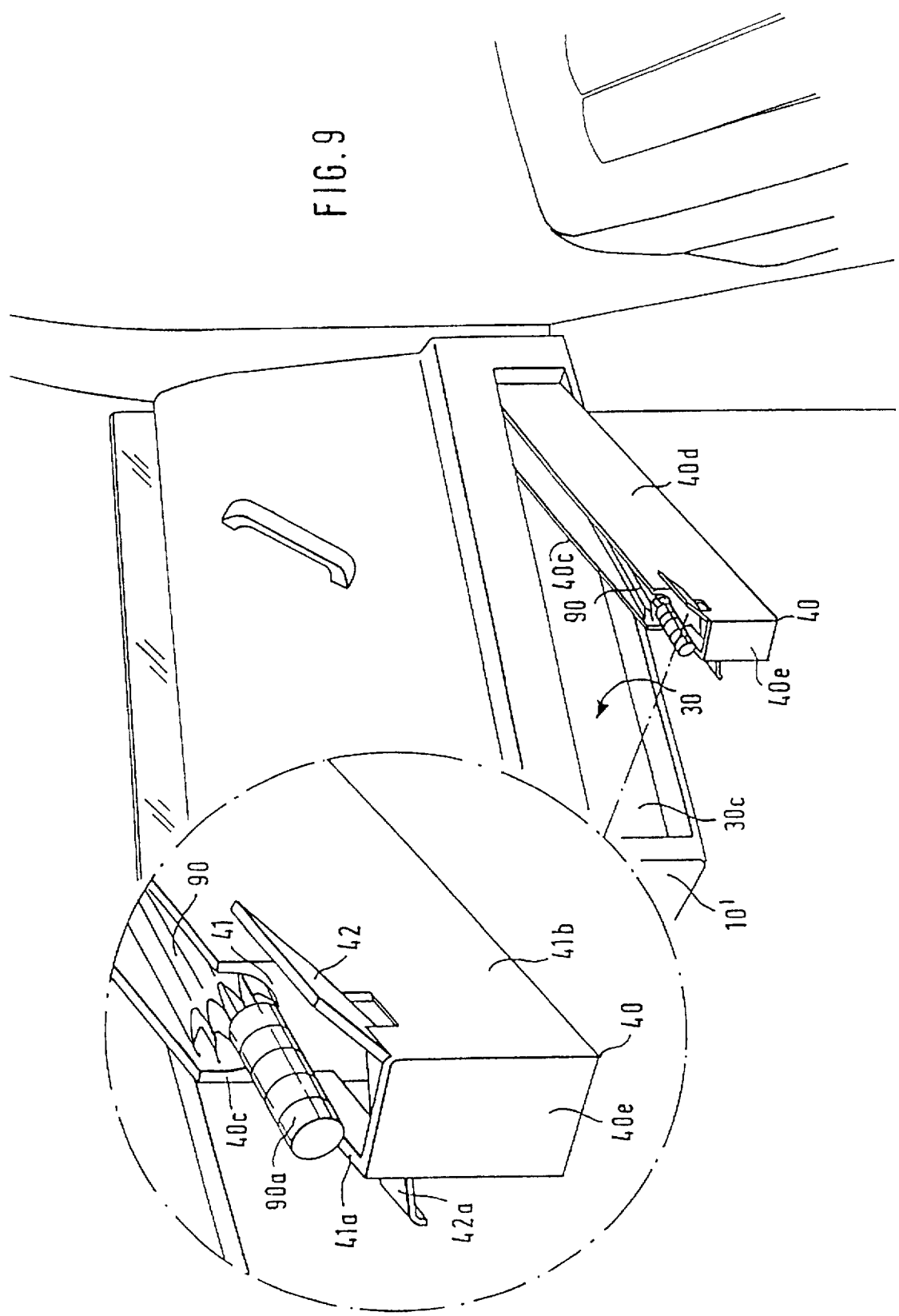

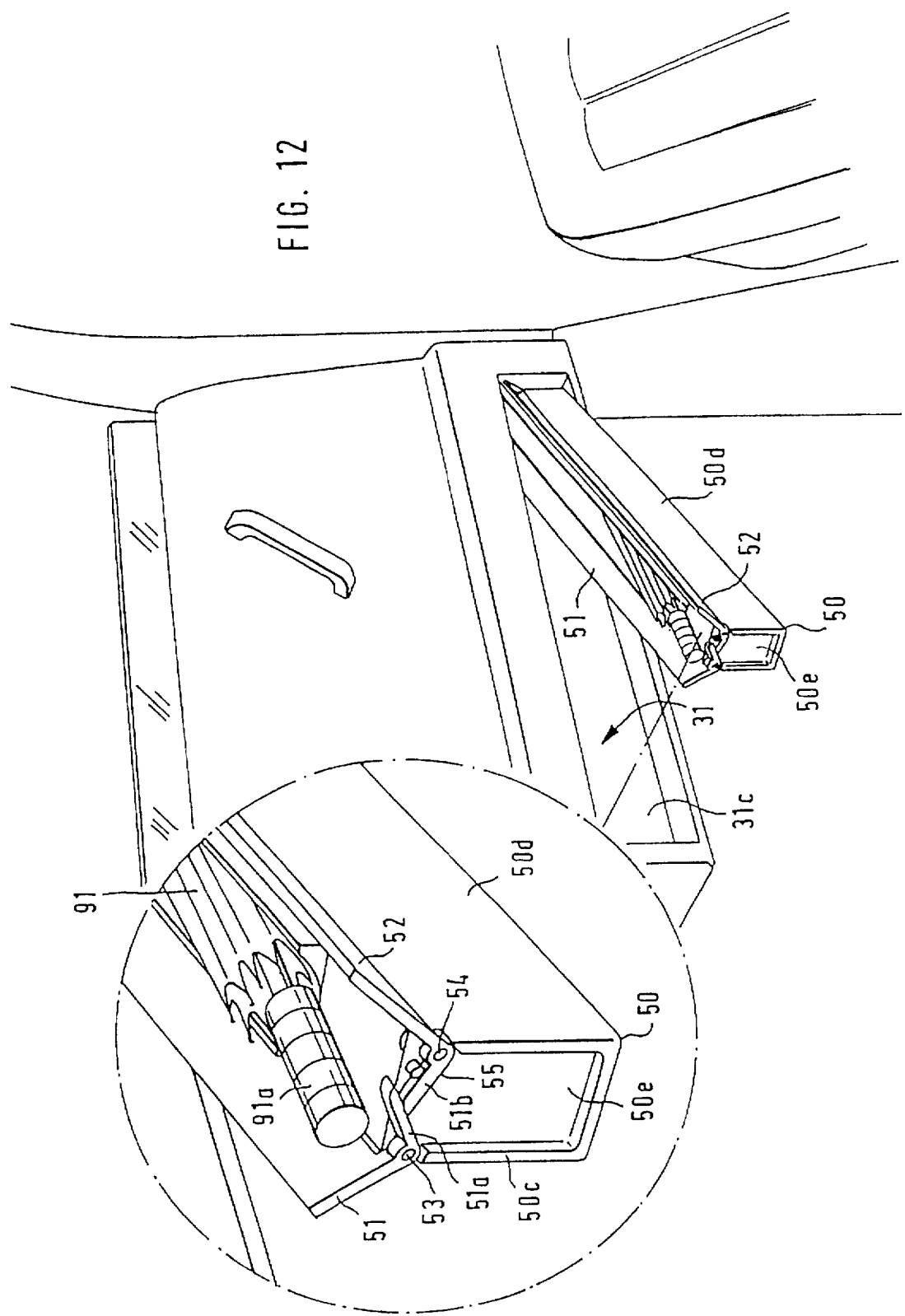

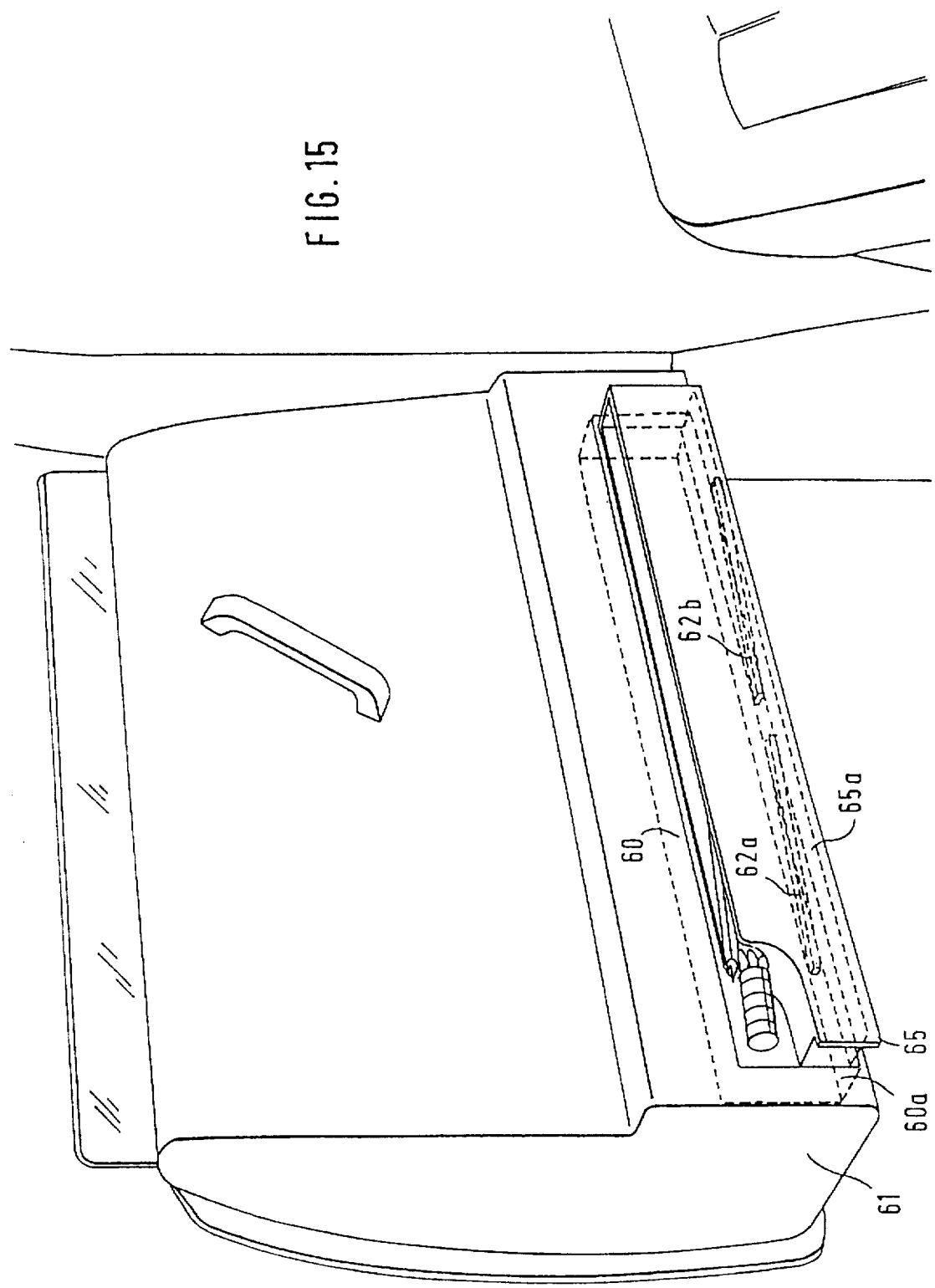

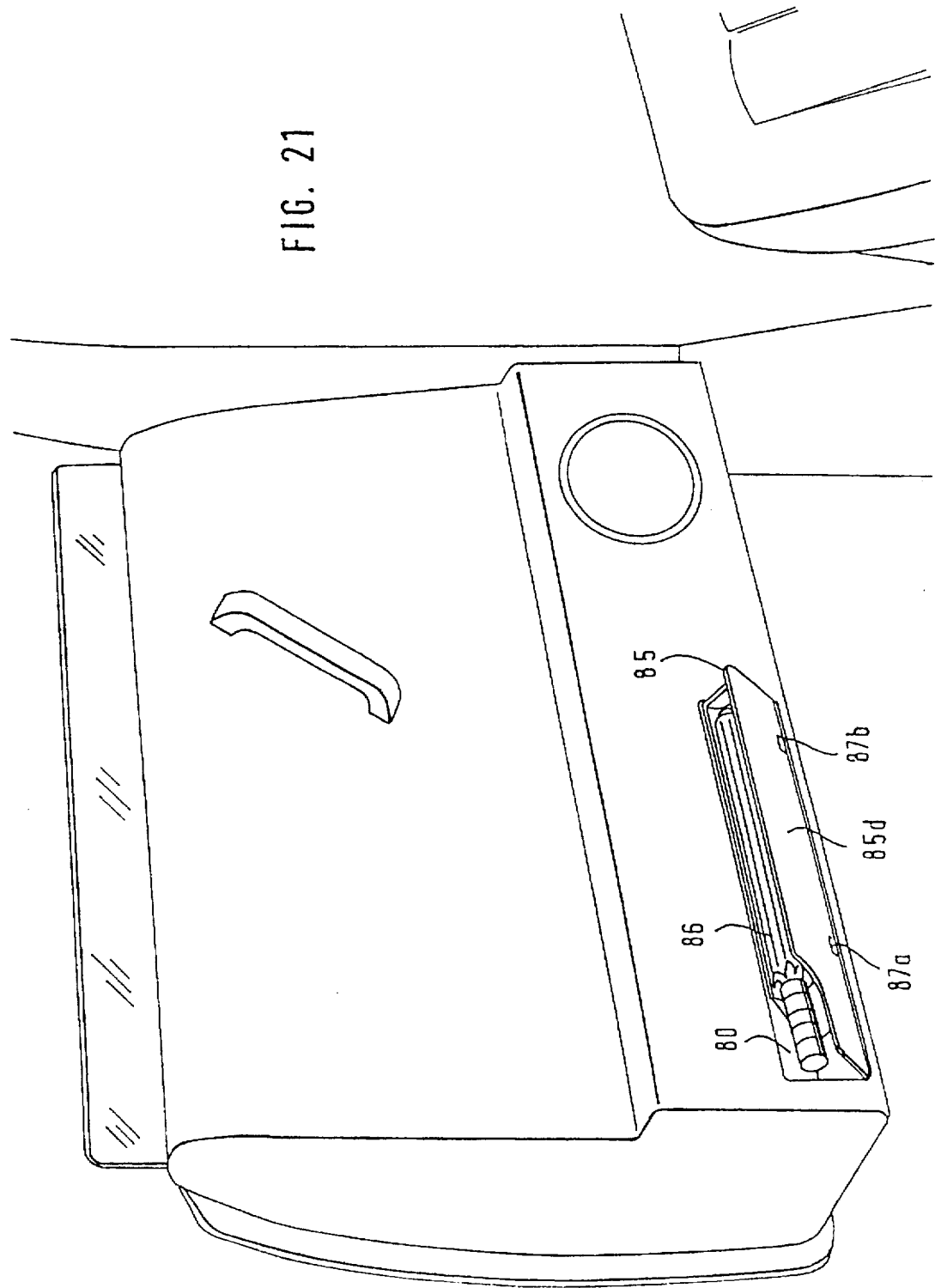

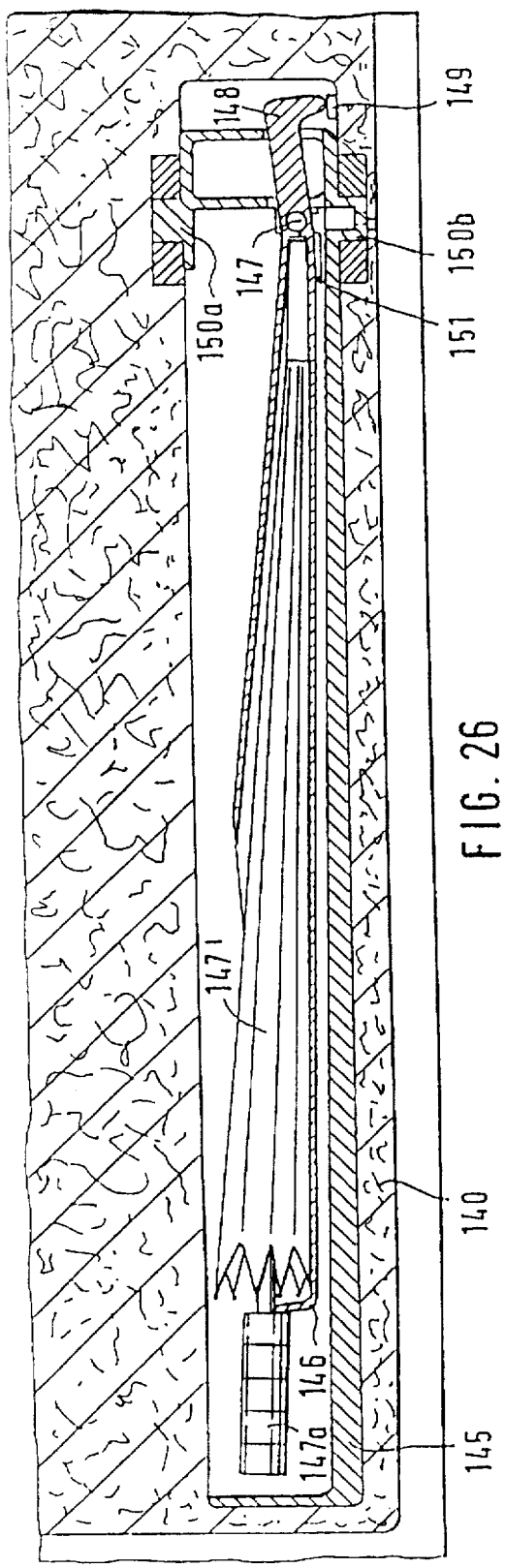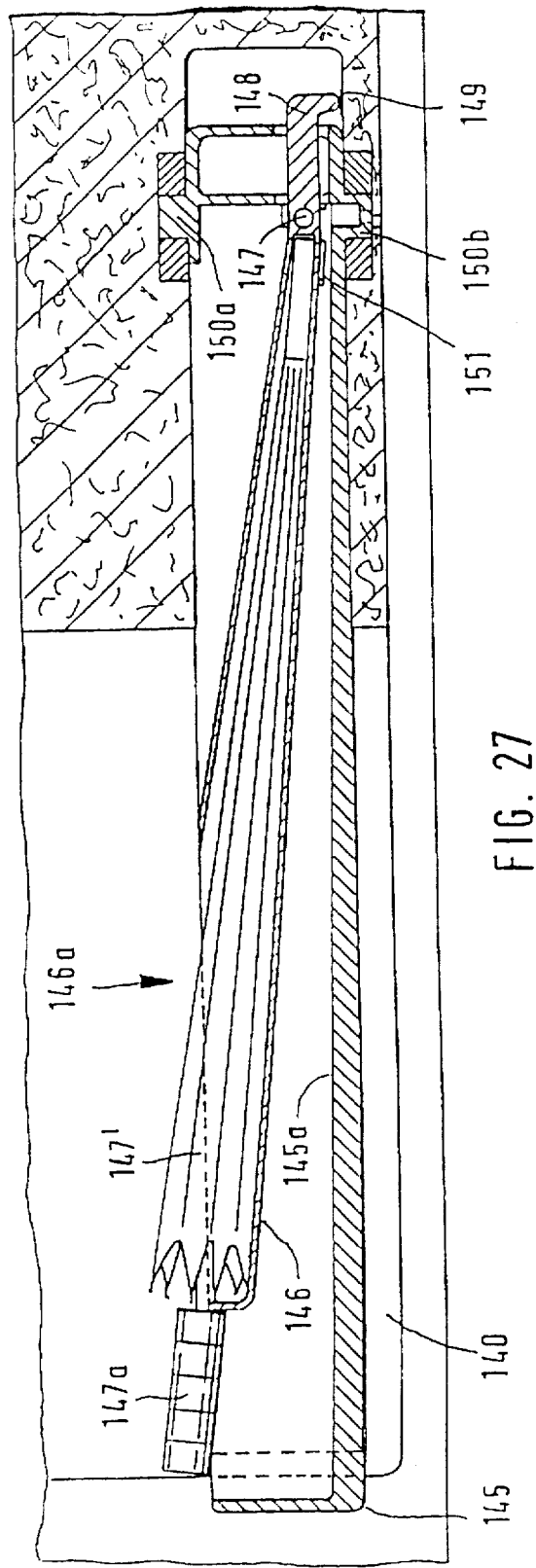

STORAGE DEVICE, ESPECIALLY FOR UMBRELLAS, FOR INSTALLATION IN MOTOR VEHICLES

DESCRIPTION

The present invention relates to a storage device, especially for umbrellas, for installation in motor vehicles.

A specific place for storing umbrellas is not normally provided in motor vehicles.

Because of their size, umbrellas are generally placed on the rear seat or on the parcel shelf, which is, however, appropriate only for dry umbrellas.

Wet umbrellas are usually placed on the floor behind the driver's or front passenger's seat or in front of the front passenger's seat. That, however, is appropriate only when the rear seats and/or the front passenger seat is/are not being used. Wet umbrellas are thus often also stored in the boot, which means, however, that the user is rained on.

In addition to the risk of an umbrella that is lying on the floor being damaged by passengers, especially as they are getting in and out, during the handling of wet umbrellas not only do the interior furnishings of the motor vehicle become wet but generally the user also, which is likewise undesirable.

In order to prevent the user from being rained on when leaving the motor vehicle, it should be possible to house the umbrella in the motor vehicle in such a manner that it can be picked up by a user who is in a sitting position and put up, once the motor vehicle door has been opened, before the motor vehicle is left.

As the user gets into the motor vehicle, the umbrella should not have to be closed until after the user has taken his seat.

That means that the storage device must be so arranged in the motor vehicle that the umbrella can readily be inserted in the storage device and removed therefrom by the user from his sitting position.

In the process, in the case of a wet umbrella neither the user nor the interior furnishings of the motor vehicle should become wet.

In the stored state, the umbrella should be protected against damage, dirt and dust and should be housed in the motor vehicle to be as visually unobtrusive as possible.

In order to dry a wet umbrella and to avoid the formation of mould spots, ventilation, preferably with warm air, should be provided.

Furthermore, it should be possible for the drip water from a wet umbrella to be caught in the storage device and removed from the motor vehicle.

It should be possible to integrate the storage device in an existing empty area, with minimum structural alterations and without fundamental changes to the vehicle concept, taking account of the varying spatial conditions and desired interior furnishings in individual vehicle models.

The problem underlying the present invention is to create a storage device, especially for umbrellas, for installation in motor vehicles, which storage device takes account of the requirements mentioned.

The features provided according to the invention for solving that problem are given in patent claim 1.

The storage device according to the invention consists of a receiving compartment that is arranged in a side door of the motor vehicle and an umbrella holder that is movably connected to the receiving compartment, which umbrella holder is movable between an inner end position, in which the umbrella is enclosed in the receiving compartment, and an outer end position, in which the umbrella can be removed from the umbrella holder or inserted therein.

The receiving compartment is accommodated in the hollow area of the vehicle door, which hollow area is formed between the outer wall and the inner panel.

For horizontal storage of the umbrella, the receiving compartment is arranged preferably in the lower region of the vehicle door and, for vertical storage of the umbrella, is arranged preferably in the rear region of the vehicle door.

The umbrella holder is preferably rotatably or swivellably connected to the receiving housing and preferably can be opened out towards the inside of the vehicle into the free area between the door frame and the vehicle door, which free area is formed as the vehicle door opens.

The umbrella holder is also preferably so constructed that, in the outer end position, the umbrella can be inserted from above or removed upwards, it being possible to provide means that enable the handle of an inserted umbrella to be grasped readily.

Such means may include support elements that so secure the umbrella in the umbrella holder that the umbrella handle is freely accessible in the outer end position of the umbrella holder.

It is also possible to provide means that, in the outer end position, move the umbrella such a distance out of the umbrella holder that the umbrella handle can be grasped readily.

It would also be possible, in the outer end position, to displace or fold out parts of the umbrella holder so that the umbrella handle is exposed and may be grasped readily.

It would also be possible to facilitate the insertion of the umbrella into the umbrella holder by means of such elements that can be displaced or opened out.

In addition, the use of such means would allow a relatively narrow construction of the umbrella holder and receiving compartment, the installation depth of the storage device in the vehicle door being correspondingly shallow.

The movements of the means that move the umbrella out of the umbrella holder or the displacement or opening out of parts of the umbrella holder may be activated by mechanically driven control or by way of a control cam against the force of springs by the movement of the umbrella holder from one end position to the other.

In the inner end position, the receiving compartment is closed preferably by a cover arranged on the umbrella holder.

The movement of the umbrella holder from the inner to the outer end position is effected preferably by spring force, against which the umbrella holder is secured in the receiving compartment in the inner end position by means of a manually releasable locking mechanism.

The outwards movement of the umbrella holder is preferably damped by a brake element.

Furthermore, means may be provided that move the umbrella holder automatically from the outer to the inner end position as the vehicle door closes.

Such means could include, for example, stops on the umbrella holder that run up against the door frame as the vehicle door closes.

By means of an inactivation facility of the locking mechanism, it would be possible for the umbrella holder to open automatically as the vehicle door opens.

The drip water from an umbrella inserted in the umbrella holder should be caught, preferably in a collecting channel that is arranged in the umbrella holder or in the receiving compartment and taken to a drain pipe that is arranged in the region of the underside of the vehicle door, which drain pipe is provided with an outlet valve which, as the vehicle door opens, releases the collected drip water that can thus be emptied outside.

Depending on the construction of the storage device, a flexible hose connection or a couplable and uncouplable pipe connection with a valve seal would have to be provided between the collecting channel in the umbrella holder and the drain pipe in the receiving compartment.

The interior of the receiving housing could be ventilated by means of a warm air blower that is preferably activated by an umbrella inserted in the umbrella holder and inactivated by a time switch.

It should be mentioned for the sake of completeness that, in the sense of a kinematic reversal, it would, of course, also be possible to move the receiving housing in relation to the umbrella holder and, in accordance with that principle, for example, render an umbrella holder that is arranged fixedly on the vehicle door freely accessible for the insertion and removal of the umbrella.

To sum up, the storage device according to the invention offers the following advantages:

- The insertion and removal of the umbrella takes place outside the motor vehicle and thus requires no free space inside the vehicle.
- The insertion and removal of the umbrella is carried out from a comfortable sitting position. Even with a small opening angle of the vehicle door, the umbrella can be removed from the storage device and inserted therein.
- The user always stays dry: the umbrella can be removed from the storage device and put up before he gets out, and can be folded down and returned to the storage device after he gets in.
- The wet umbrella never comes inside the motor vehicle so that neither the user nor the interior furnishings become wet.
- The drip water from a wet umbrella is caught in the storage device and automatically emptied outside as the vehicle door opens.
- The umbrella is dried after being inserted in the storage device.
- Opening and closing of the storage device take place automatically at the push of a button or as the vehicle door closes.
- The storage device can be installed, without fundamental change to the vehicle concept, vertically or horizontally depending on the spatial conditions, in an empty area in the vehicle door.
- Means that move the umbrella out of the umbrella holder in the outer end position, or elements of the umbrella holder that can be displaced or folded out to expose the umbrella handle, or as an aid for the insertion of the umbrella, enable the storage device to be constructed extremely compactly to have a shallow installation depth in the vehicle door.

The storage device according to the invention is, of course, suitable not only for storing one or more umbrellas.

It would be possible to house in the storage device also other useful articles, especially those required outside the motor vehicle and thereby exposed to damp and wet, such as, for example, brushes for clearing snow and ice-scrapers.

Neither is the installation of the storage device according to the invention restricted to the vehicle door on the driver's side.

Further features and advantages of the invention are apparent from the subsidiary claims and from the description of the invention and are explained hereinafter with reference to the accompanying drawings, in which, in diagrammatic form:

FIG. 5 is a cross-section through the storage device according to the embodiment of FIGS. 1 to 4;

FIG. 6 is a longitudinal section of the storage device according to the drawing in FIG. 5;

FIG. 7 is a detail view of the storage device according to the drawing in FIGS. 5 and 6, in plan view and side view;

FIG. 8 is a detail view of the storage device according to the drawing in FIGS. 5 and 6, in plan view and side view;

FIG. 9 is a perspective view of a second embodiment of the storage device with the vehicle door open and the umbrella holder in the outer end position;

FIG. 12 is a perspective view of a third embodiment of the storage device with the vehicle door open and the umbrella holder in the outer end position;

Fig.15 is a perspective view of a fourth embodiment of the storage device with the vehicle door open and the umbrella holder in the outer end position;

FIG. 21 is a perspective view of a sixth embodiment of the storage device with the vehicle door open and the umbrella holder in the outer end position;

FIG. 26 is a longitudinal section through a ninth embodiment of the storage device with the umbrella holder in the inner end position;

FIG. 27 is a longitudinal section through the umbrella holder according to the embodiment of FIG. 26 with the umbrella holder in the outer end position;

FIGS. 1 to 8 illustrate a first embodiment of the storage device.

Figure 1:
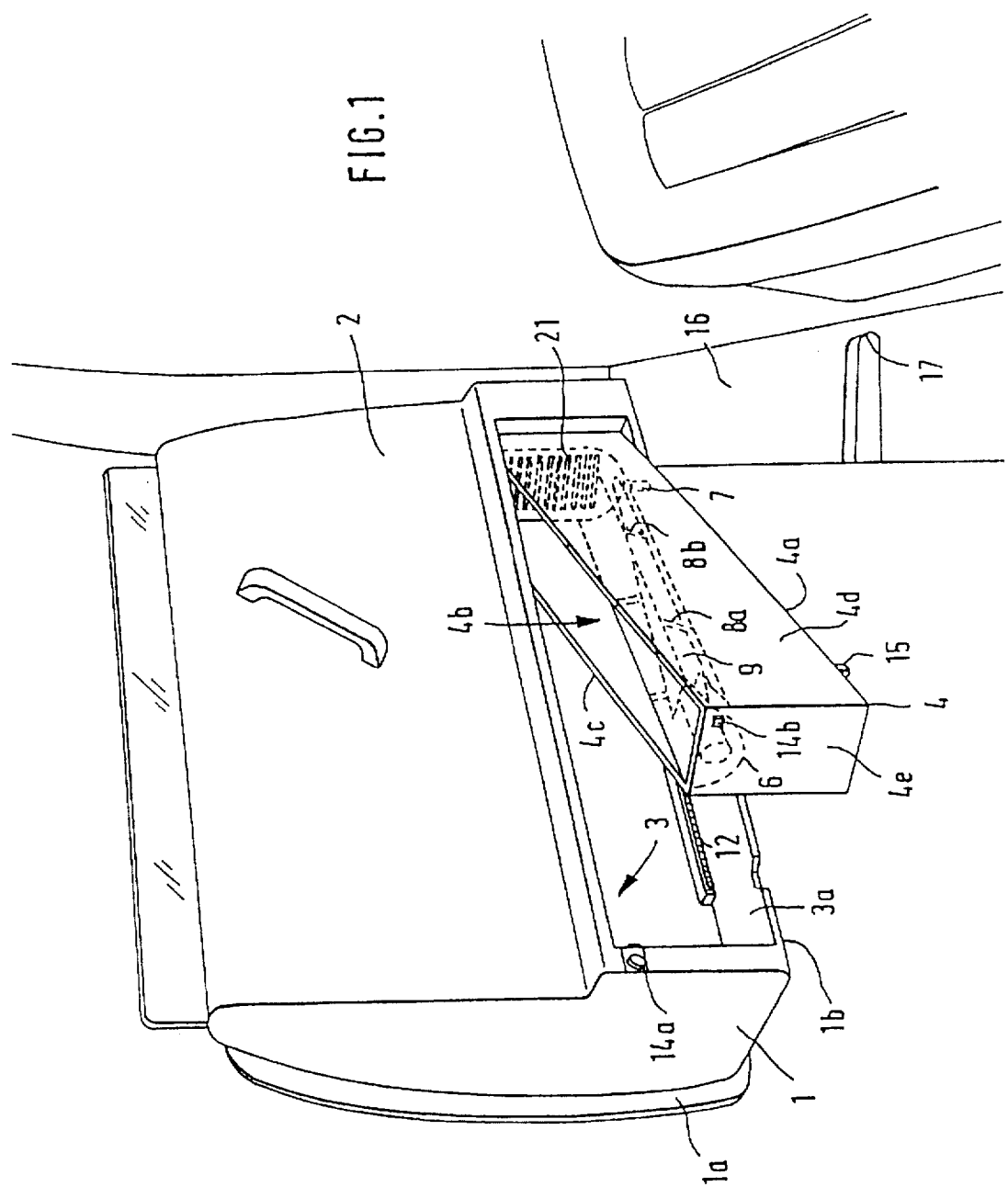
FIG. 1 is a perspective view of a first embodiment of the storage device with the vehicle door open and the umbrella holder in the outer end position.
Figure 2:
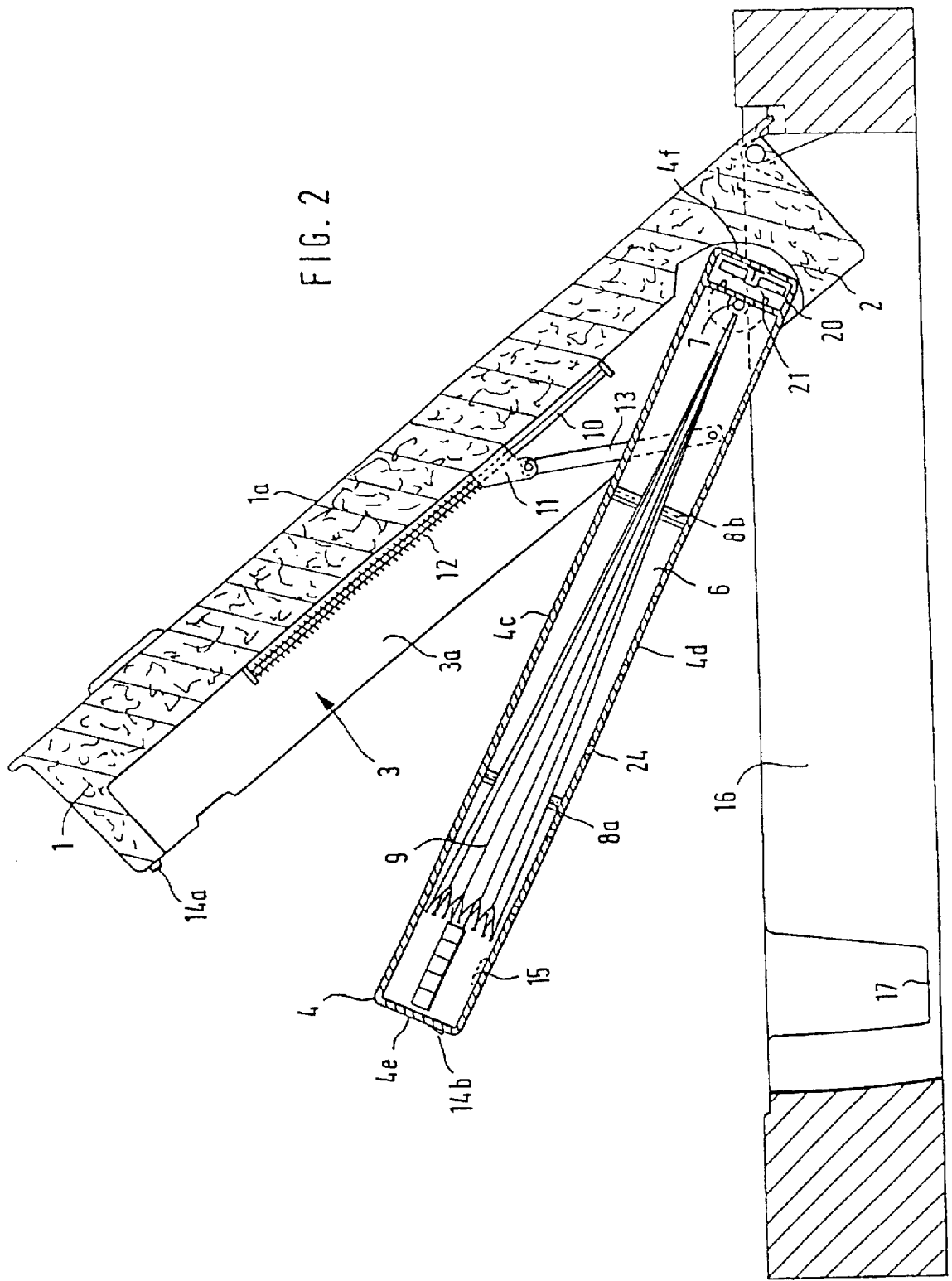
FIG. 2 is a plan view of the storage device according to the drawing in FIG. 1.
Figure 4:
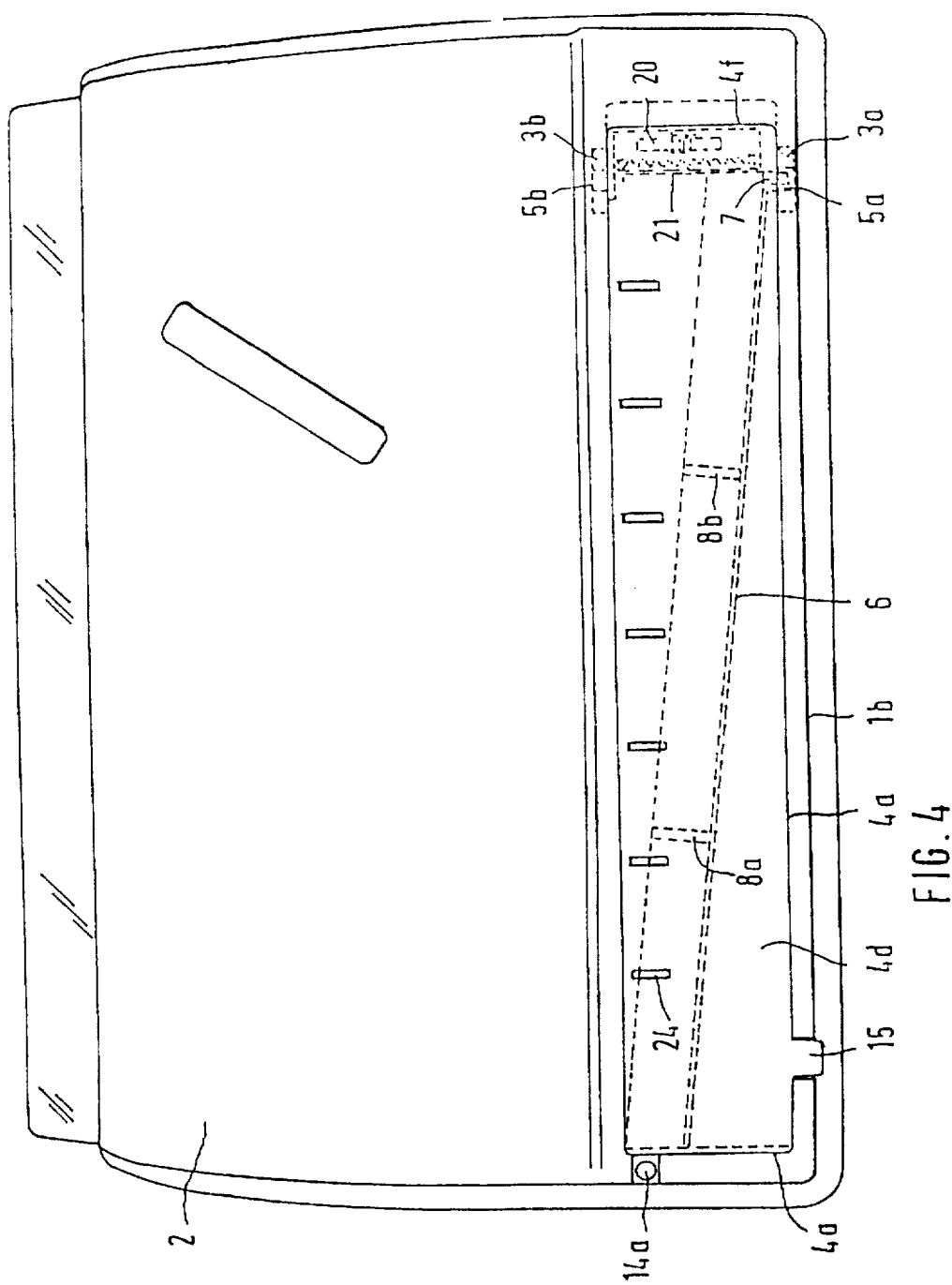
FIG. 4 is a side view of the storage device according to the drawing in FIG. 3.
Figure 3:
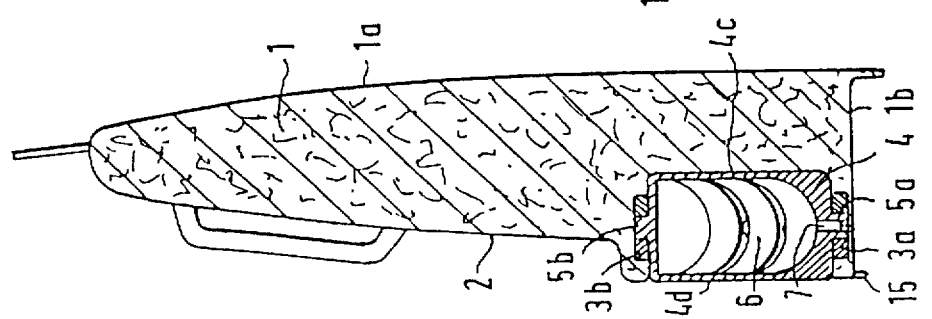
FIG. 3 is a cross-section through the storage device according to the embodiment of FIGS. 1 and 2 with the umbrella holder in the inner end position.

A hollow area is formed in the vehicle door 1 between the outer wall 1a and the inner panel 2. Arranged in the lower region of the hollow area is the receiving compartment 3 which extends substantially over the length of the vehicle door 1.

The umbrella holder 4 is mounted in the receiving compartment 3 to rotate in the base wall 3a and in the top wall 3b by way of the two vertical axles 5a, 5b.

The umbrella holder 4 is open on its upper side 4b and is U-shaped in cross-section, being formed by the rear wall 4c, the base wall 4a and the cover 4d, and is closed on the two narrow sides by the end walls 4e, 4f.

Arranged at a slight inclination in the umbrella holder 4 is the trough-shaped collecting channel 6 which opens out at its front end into the drain pipe 7 which projects concentrically through the axle 5a and is provided, on the underside 1b of the vehicle door 1, with a rotary valve 18a, 18b.

Arranged in the collecting channel 6 are the two umbrella supports 8a, 8b that keep the umbrella 9 at a distance from the collecting channel 6.

Arranged in the receiving compartment 3 is the guide rod 10, on which the slide 11, which is urged forwards by the compression spring 12, is guided.

By way of the push-rod 13 that is mounted rotatably on the slide 11 and on the base wall 4a, the umbrella holder 4 is moved, as the vehicle door opens, from the inner to the outer end position by the release of the locking mechanism 14a, 14b, the opening movement being damped by a friction brake arranged in the slide 11.

In the outer end position, the umbrella 9 can be removed from and inserted into the umbrella holder 4 which is freely accessible from above.

The umbrella holder 4 can be swivelled back into the receiving compartment 3 manually against the force of the compression spring 12 until the locking mechanism 14a, 14b engages.

If the umbrella holder 4 is in the outer end position as the vehicle door 1 closes, swivelling back into the receiving compartment 3 is effected automatically, the driver member 15 running up against the stop 17 that is arranged on the door sill 16 and thus holding the umbrella holder 4 back until the locking mechanism 14a, 14b engages.

As a result of the inactivation of the locking mechanism 14a, 14b, the umbrella holder 4 moves automatically into the outer end position as the vehicle door 1 opens, which additionally facilitates the handling of the umbrella 9.

The drip water from an umbrella 9 inserted in the umbrella holder 4 is caught in the collecting channel 6 and taken to the drain pipe 7 which is closed by the rotary valve 18a, 18b as long as the umbrella holder 4 is in the inner end position (FIG. 7).

As a result of the relative movement between the receiving compartment 3 and the umbrella holder 4, the elements of the rotary valve 18a, 18b are turned to coincide as soon as the umbrella holder 4 swivels into the outer end position (FIG. 8), which is possible only once the vehicle door 1 is so wide open that the rotary valve 18a, 18b is located beyond the door sill 16 so that the drip water can empty to the outside.

Alternatively, the rotary valve 18a, 18b could, of course, also be opened and closed by the opening and closing movement of the vehicle door 1.

Housed at the front end of the umbrella holder 4 between the drain pipe 7 and the front end wall 4f is the fan 20 which is separated from the inside of the umbrella holder 4 by the ventilation grille 21.

The fan 20 is supplied by way of the on-board power supply and can be activated by means of a manually operated switch or by means of a sensor on insertion of the umbrella 9 and can be inactivated by means of a time switch.

The air for drying the umbrella 9 is sucked in through air slots 22 arranged in the end wall 4f, heated at the coils 23 and blown into the umbrella holder 4 through the ventilation grille 21.

Instead of a fan, ventilation slots 24 can be arranged as an alternative on the cover 4d, through which slots the air from the on-board footwell ventilation can pass to the inside of the umbrella holder 4.

Figure 11:
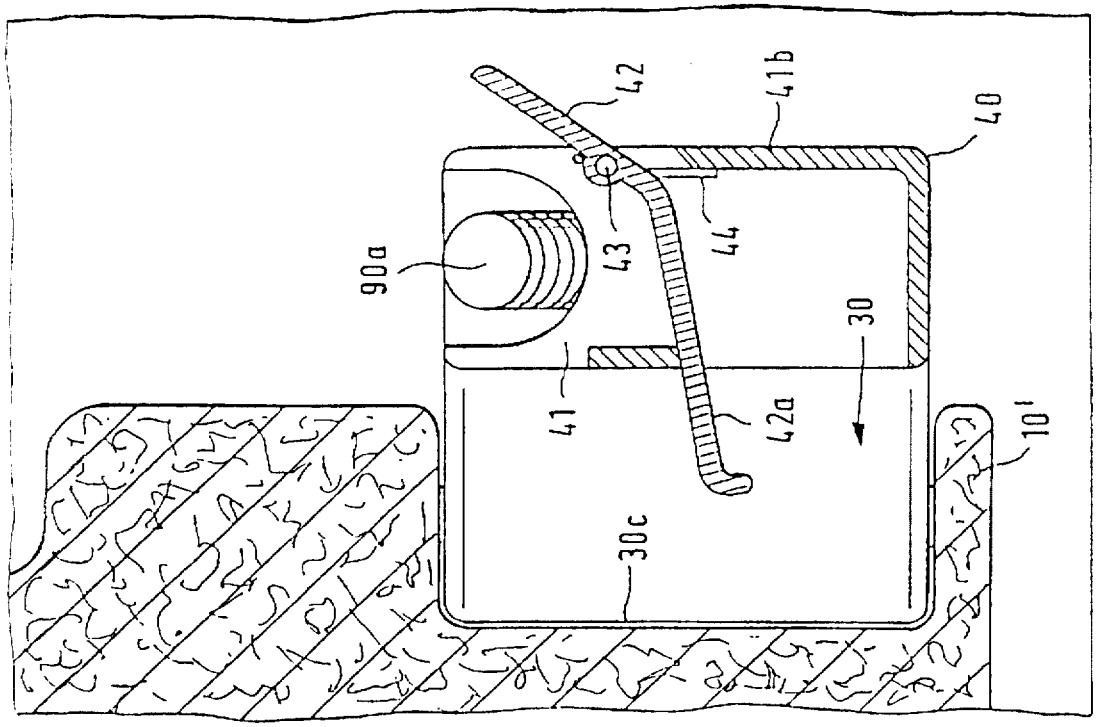
FIG. 11 is a cross-section according to the drawing in FIG. 10 with the umbrella holder in the outer end position.
Figure 10:
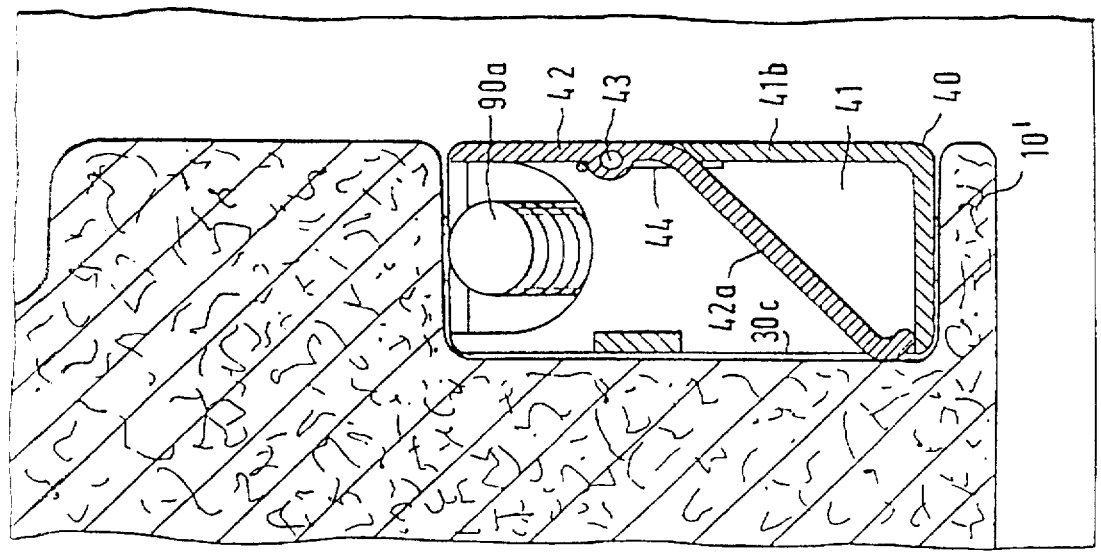
FIG. 10 is a cross-section through the storage device according to the embodiment of FIG. 9 with the umbrella holder in the inner end position.

FIGS. 9 to 11 illustrate a second embodiment of the storage device which corresponds substantially to the manner of construction of the first embodiment.

Arranged in the rear region of the umbrella holder 40 is the support 41, which extends parallel to the rear end wall 40e spaced therefrom according to the length of the umbrella handle 90a.

The continuations 41a of the rear wall 40c and 41b of the cover 40d, which project backwards beyond the support 41, and the rear end wall 40e are not as high as the rear wall 40c and the cover 40d.

As a result, the handle 90a of an inserted umbrella 90 is freely accessible when the umbrella holder 40 is in the outer end position.

That enables the umbrella holder 40 and the receiving compartment 30 to be constructed to be very narrow with a correspondingly shallow installation depth in the vehicle door 10'.

The closing flap 42 is hinged on the continuation 41b by way of the horizontal turning axle 43.

When the umbrella holder 40 moves from the outer to the inner end position, the control arm 42a runs up against the rear wall 30c of the receiving compartment 30. As a result, the closing flap 42 is pivoted up against the leg spring 44 to lie flush with the cover 40d and the continuation 41b and, together with the latter, covers the opening of the receiving compartment 30.

In the outer end position, the closing flap 42 is folded so far down by the leg spring 44 that the umbrella handle 90a is freely accessible and can be grasped readily.

Figure 14:
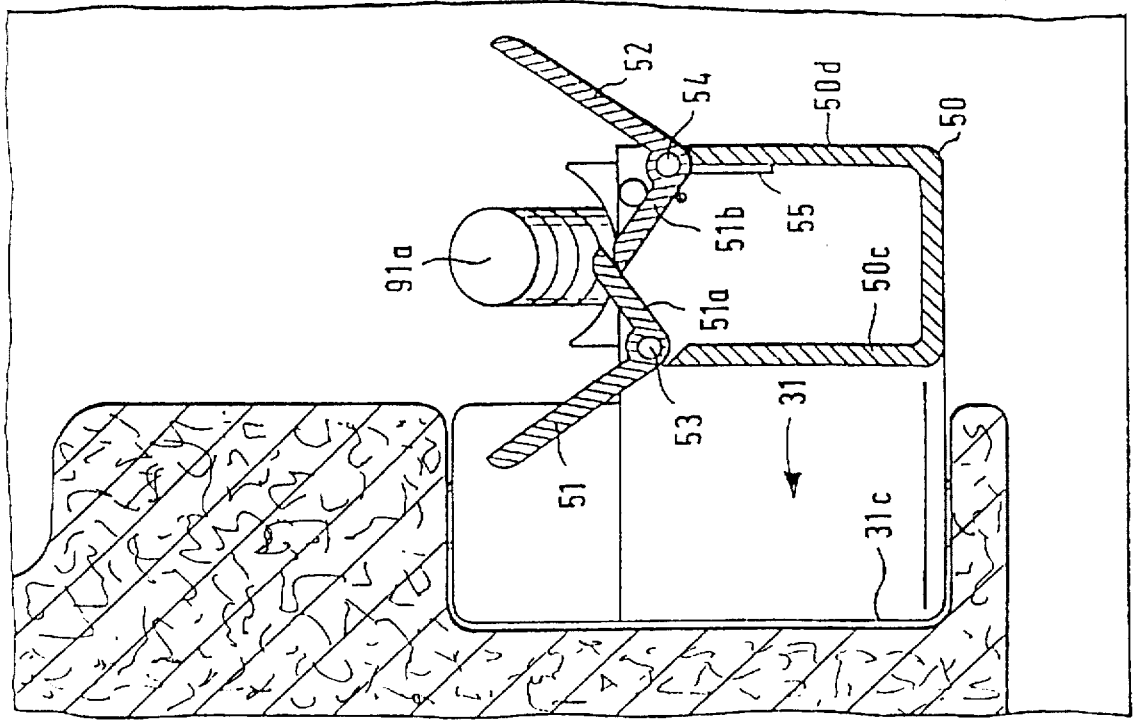
FIG. 14 is a cross-section according to the drawing in FIG. 13 with the umbrella in the outer end position.
Figure 13:
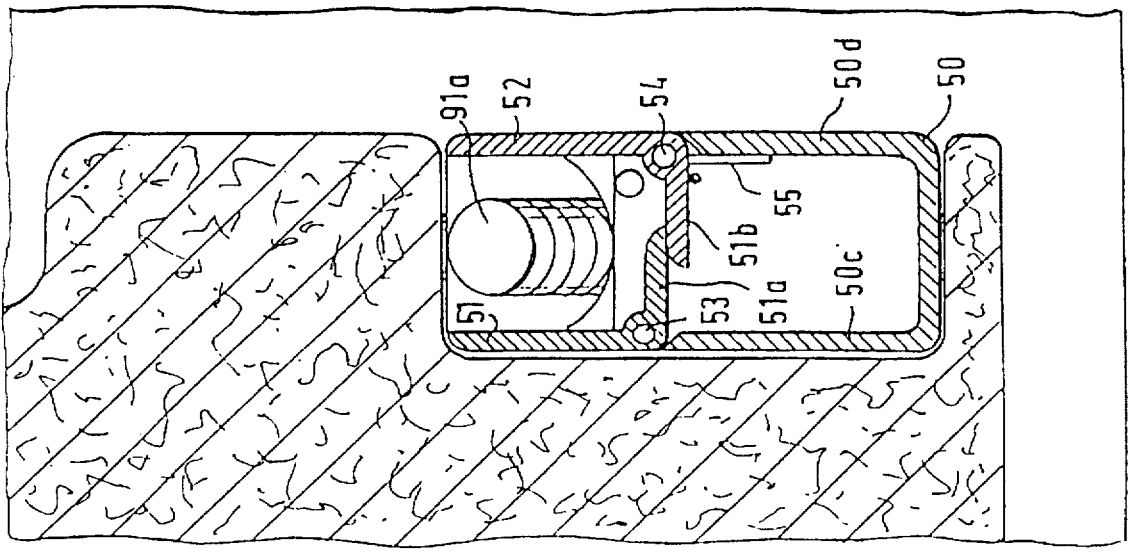
FIG. 13 is a cross-section through the storage device according to the embodiment of FIG. 12 with the umbrella holder in the inner end position.

FIGS. 12 to 14 illustrate a third embodiment of the storage device which likewise substantially corresponds to the manner of construction of the first embodiment.

The rear wall 50c, the cover 50d and the rear end wall 50e of the umbrella holder 50 are, however, not as high as in the first embodiment and the rear portion of an inserted umbrella 91 projects beyond them.

The flaps 51, 52 which extend over the length of the umbrella holder 50 are hinge-mounted on the upper end edges of the rear wall 50c and of the cover 50d to pivot by means of the axles 53, 54.

By way of the control arms 51a, 52a[1] that engage one over the other behind the end wall 50e, in the outer end position the flaps 51, 52 are opened out simultaneously by the spring 55 or, in the inner end position, they are moved back into a vertical position as a result of the flap 51 running up against the rear wall 31c of the receiving compartment 31.

[1] Translator's note: Presumably in error for 51b.

In the outer end position, the flaps 51, 52 form an aid for inserting the umbrella 91 into the umbrella holder 50. The umbrella handle 91a is at the same time freely accessible.

That embodiment too enables a very shallow installation depth of the storage device in the vehicle door.

Figure 17:
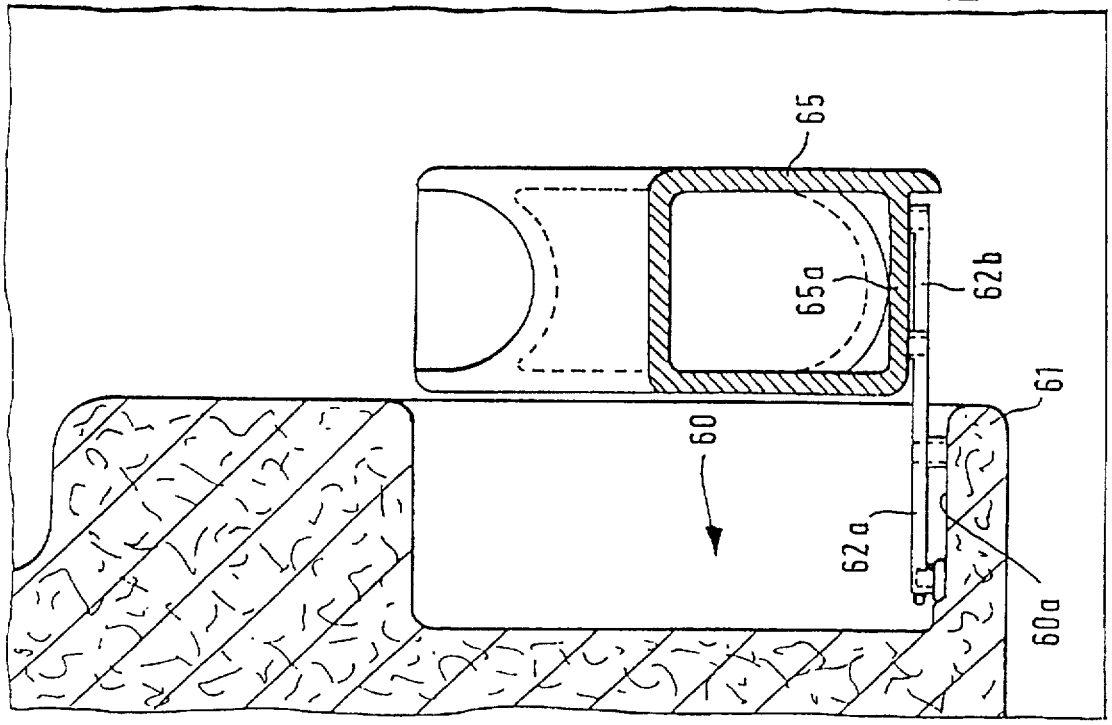
FIG. 17 is a cross-section according to the drawing in FIG. 16 with the umbrella holder in the outer end position.
Figure 16:
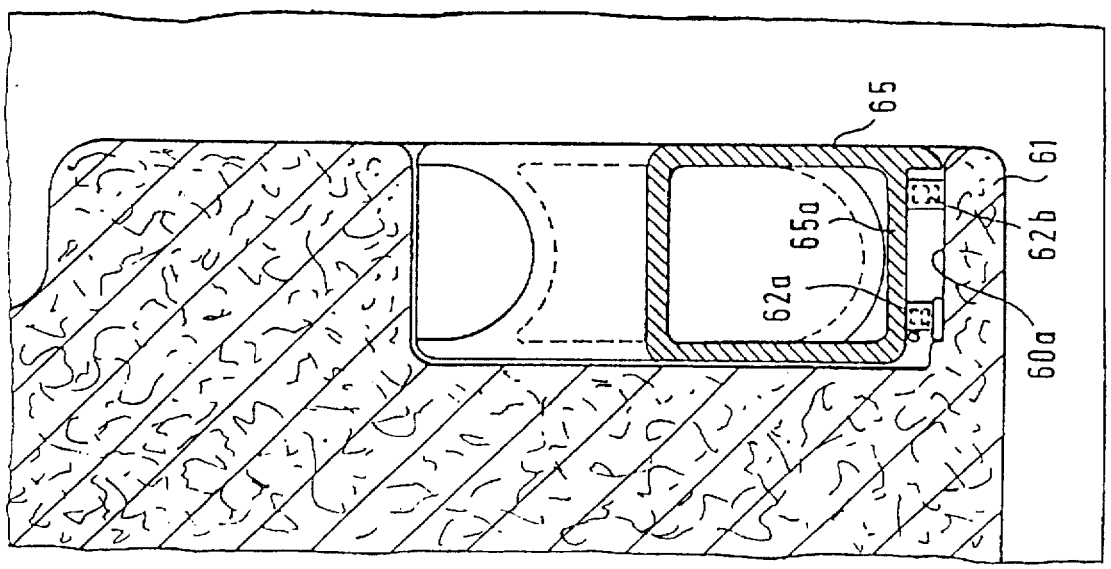
FIG. 16 is a cross-section through the storage device according to the embodiment of FIG. 15 with the umbrella holder in the inner end position.

FIGS. 15 to 17 illustrate a fourth embodiment of the storage device.

As is the case in the preceding embodiments, the receiving compartment 60 and the umbrella holder 65 are arranged in the lower region of the vehicle door 61 and extend substantially over the length thereof.

The receiving compartment 60 and the umbrella holder 65 are connected to one another by way of the parallel guide arms 62a, 62b that are articulatedly mounted to pivot, on the one hand, on the base wall 60a of the receiving compartment 60 and, on the other hand, on the base wall 65a of the umbrella holder 65.

The position of the umbrella holder 65 in the outer end position and also during its movements between the two end positions thus always remains parallel with the receiving compartment 60.

Figure 18:
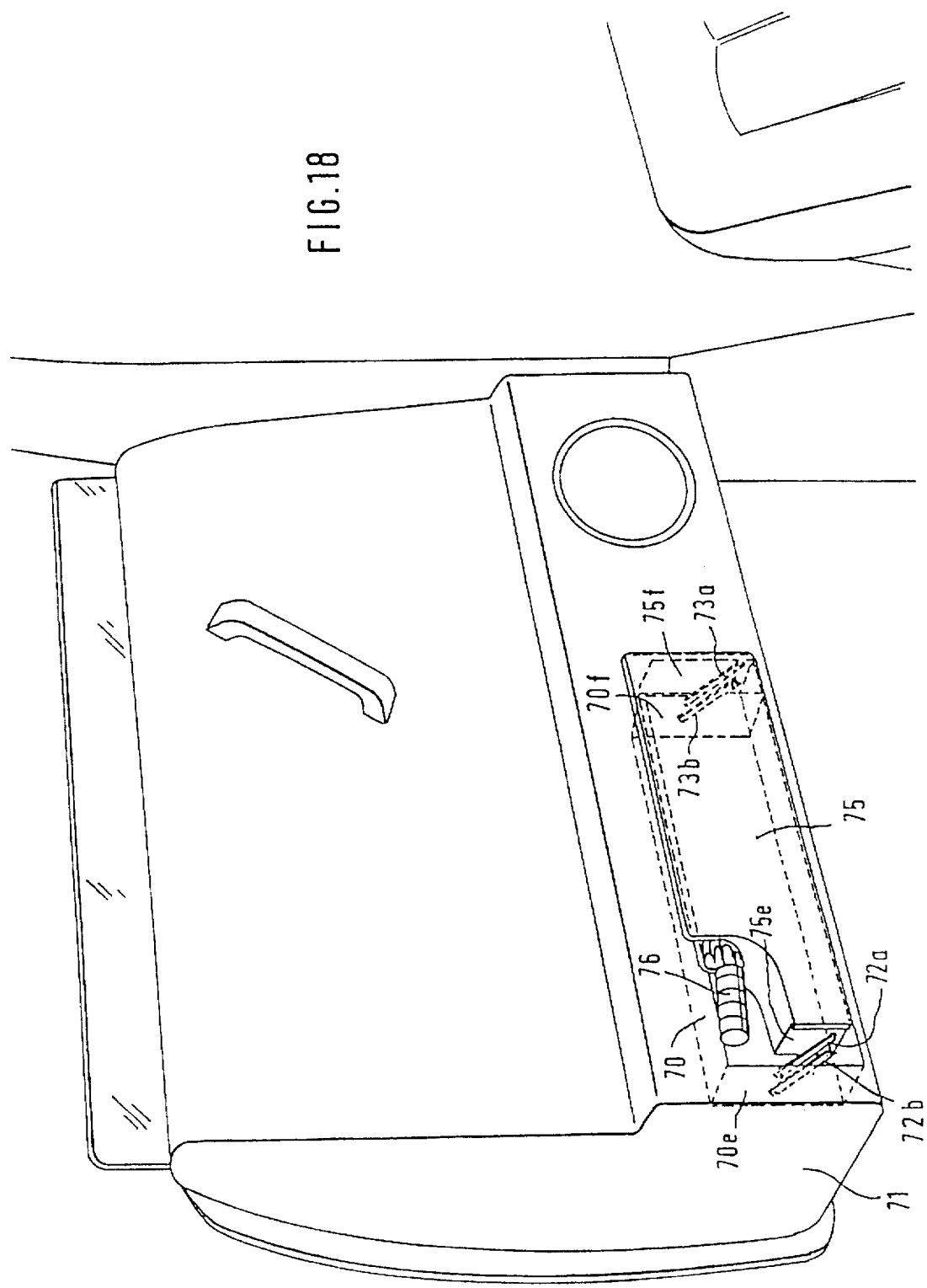
FIG. 18 is a perspective view of a fifth embodiment of the storage device with the vehicle door open and the umbrella holder in the outer end position.
Figure 20:
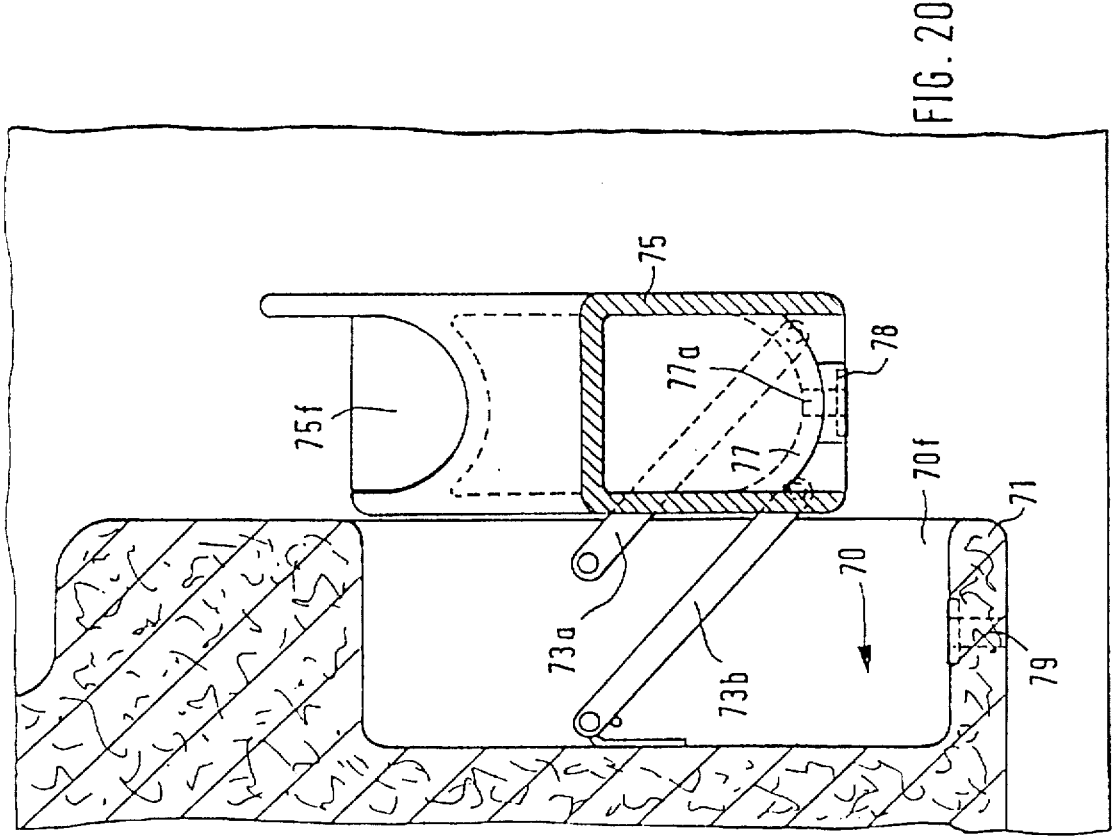
FIG. 20 is a cross-section according to the drawing in FIG. 19 with the umbrella holder in the outer end position.
Figure 19:
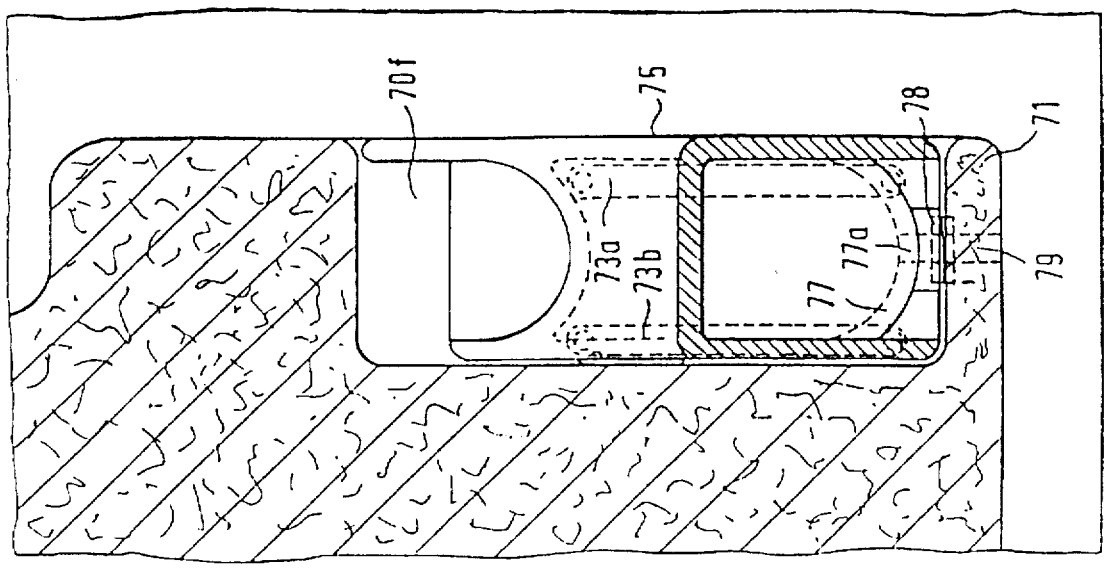
FIG. 19 is a cross-section through the storage device according to the embodiment of FIG. 18 with the umbrella holder in the inner end position.

FIGS. 18 to 20 illustrate a fifth embodiment of the storage device.

The receiving compartment 70 and the umbrella holder 75 are arranged in the lower region of the vehicle door 71 but extend only over approximately half the length of the door.

That enables the installation of additional components in the lower region of the door, such as, for example, side pockets, loudspeakers, etc..

The receiving compartment 70 and the umbrella holder 75 are connected to one another by way of the parallel guide arms 72a, 72b, 73a, 73b that are articulatedly mounted to pivot, at one side, on the side end walls 70e, 70f of the receiving compartment 70 and, at the other side, on the side end walls 75e, 75f of the umbrella holder 75.

As a result of the arrangement of the parallelogram guides 72a, 72b, 73a, 73b, the umbrella holder 75 is raised in the course of its movement from the inner to the outer end position, which, in the outer end position, facilitates the insertion and removal of the umbrella 76.

The drain pipe 77a, which is provided with a closing valve 78, is flange-mounted at the lowest point of the collecting channel 77.

In the inner end position, the closing valve 78 is coupled to the door drain 79 and opens so that the drip water from the collecting channel 77 can empty into the door drain 79.

As the umbrella holder 75 moves from the inner end position, the closing valve 78 closes so that the drip water is retained in the collecting channel 77.

Figure 23:
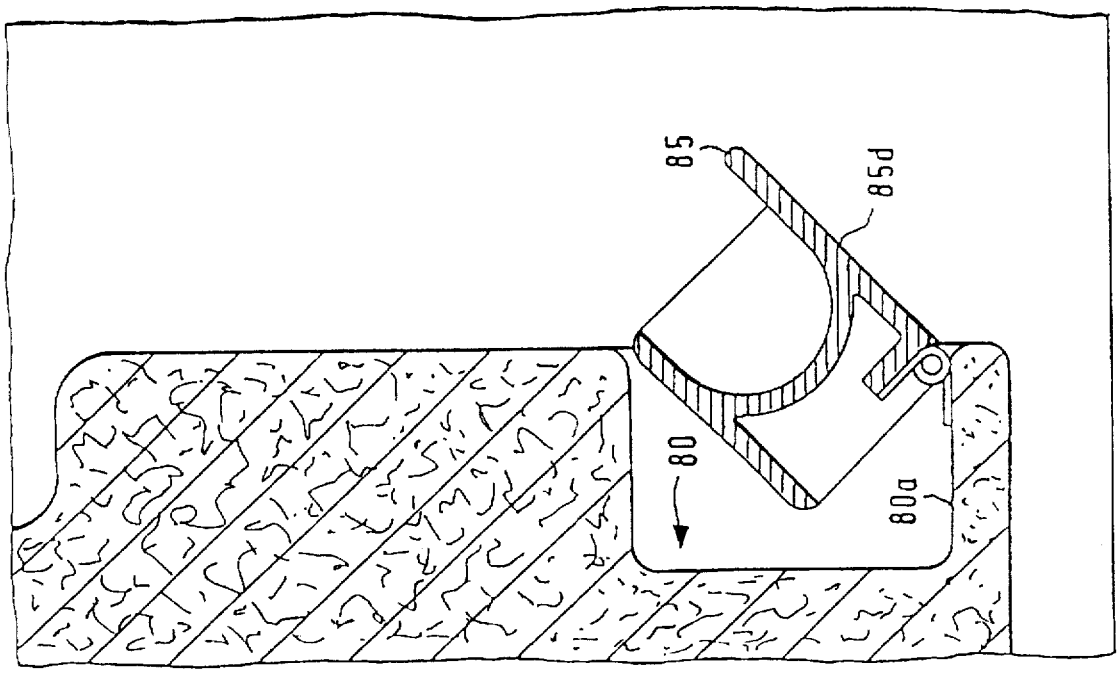
FIG. 23 is a cross-section according to the drawing in FIG. 22 with the umbrella holder in the outer end position.
Figure 22:
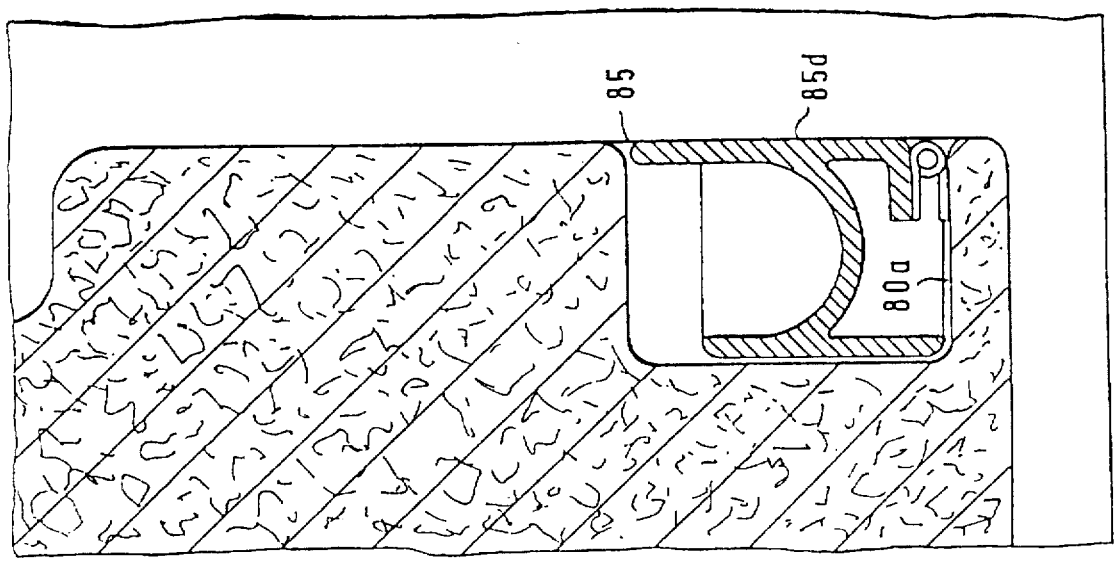
FIG. 22 is a cross-section through the storage device according to the embodiment in FIG. 21 with the umbrella holder in the inner end position.

FIGS. 21 to 23 illustrate a sixth embodiment of the storage device.

In the region of the lower longitudinal edge of the cover 85d, the umbrella holder 85 is pivotably connected to the base wall 80a of the receiving compartment 80 by way of the hinges 87a, 87b and can be opened out by such a distance that, in the outer end position, the umbrella 86 can readily be inserted in the umbrella holder 85 and removed therefrom.

Figure 24:
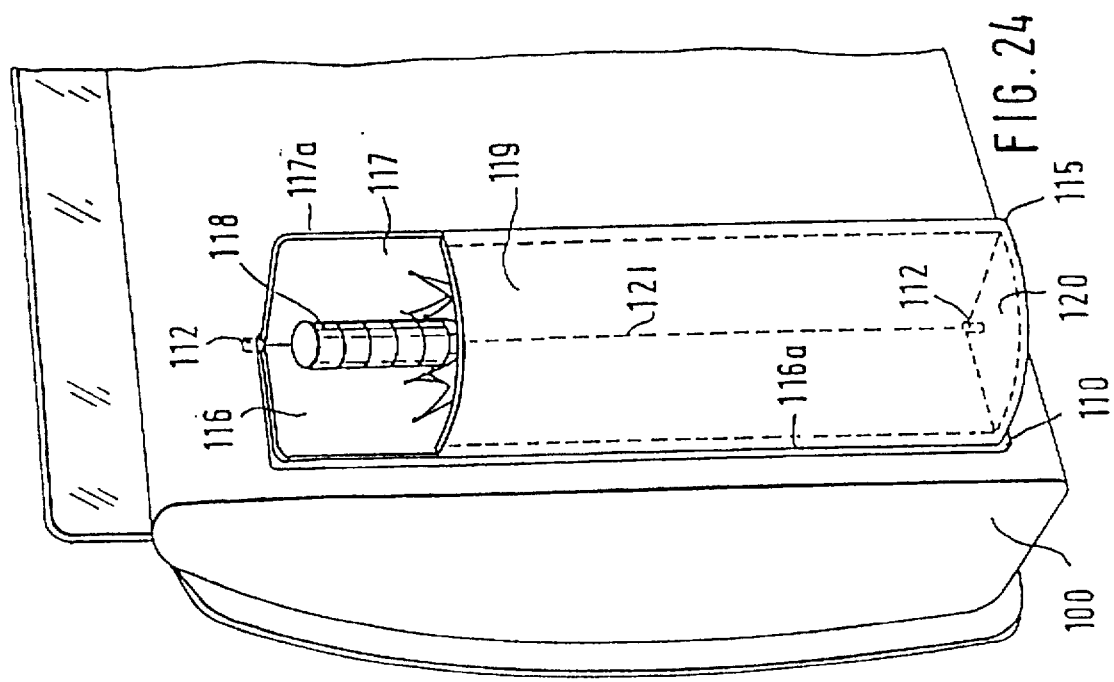
FIG. 24 is a perspective view of a seventh embodiment of the storage device with the vehicle door open and the umbrella holder in the outer end position.
Figure 28:
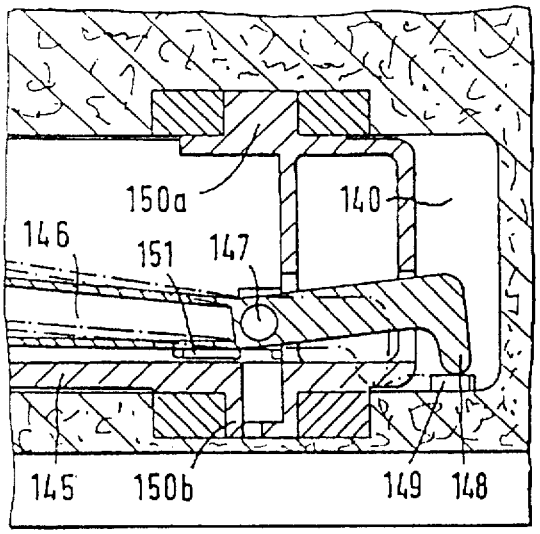
FIG. 28 is a detail view of the storage device according to the drawing in FIG. 26.
Figure 29:
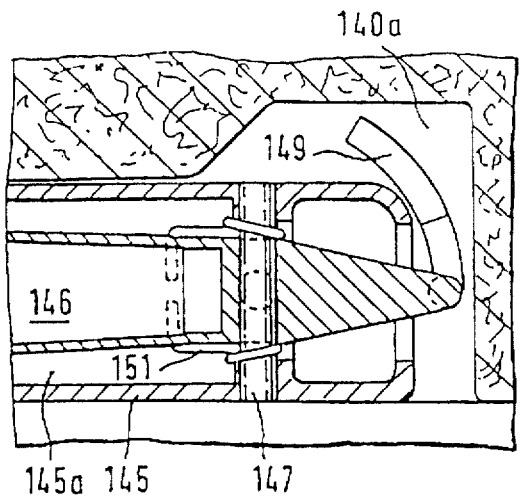
FIG. 29 is a plan view according to the drawing in FIG. 28.

FIG. 24 illustrates a seventh embodiment of the storage device. The receiving compartment 110 and the umbrella holder 115 are arranged vertically in the rear region of the vehicle door 100.

The umbrella holder 115 comprises the rear wall 116, the cover 117 that is arranged perpendicularly thereto and also the casing 119 that is set back by the length of the umbrella handle 118 and connects, in the shape of a curve, the outer longitudinal edges 116a, 117a of the rear wall 116 and of the cover 117.

The umbrella holder 115 is closed on the underside by the base wall 120.

The umbrella holder 115 is mounted in the receiving compartment 110 to pivot about a vertical axle 112 that is arranged in the region of the connecting edge 121 of the rear wall 116 and the cover 117 and runs parallel to that connecting edge 121.

In the inner end position, the opening of the receiving compartment 110 is closed by the cover 117 and, in the outer end position, by the rear wall 116 of the umbrella holder 115.

Figure 25:
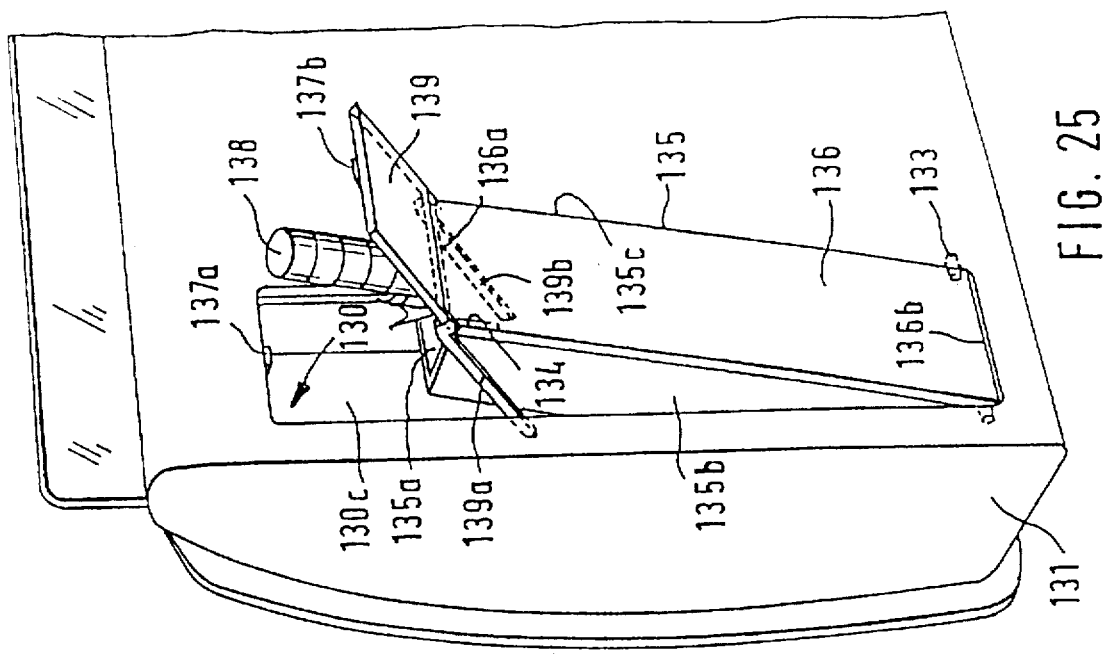
FIG. 25 is a perspective view of an eighth embodiment of the storage device with the vehicle door open and the umbrella holder in the outer end position.

FIG. 25 illustrates an eighth embodiment of the storage device, the arrangement of which in the vehicle door 131 corresponds substantially to the embodiment of FIG. 24.

The umbrella holder 135 is mounted in the receiving compartment 130 to pivot about a horizontal axle 133 that is arranged in the region of the lower end edge 136b of the cover 136 and runs parallel to that lower end edge 136b.

The heights of the cover 136 and of the rear wall 135a and of two side walls 135b, 135c of the umbrella holder 135 are reduced relative to the height of the receiving compartment 130 by the length of the umbrella handle 138.

Articulatedly mounted to pivot on the upper end edge 136a of the cover 136 is the cover flap 139 which, in the inner end position, covers the umbrella handle 138 in the receiving compartment 130 and, in the outer end position, opens out, under the action of the spring 134, so far forwards that the umbrella handle 138 is freely accessible and can be grasped readily.

Arranged on the cover flap 139 are the arms 139a, 139b which project at the sides of the two side walls 135b, 135c into the receiving compartment 130 and are supported against the rear wall 130c thereof.

As the umbrella holder 135 pivots in from the outer to the inner end position, the arms 139a, 139b are moved forwards towards the cover 136 and as a result the cover flap 139 is pivoted up into a vertical position in which the flap, together with the cover 136, covers the opening of the receiving compartment 130.

The umbrella holder 135 is held securely in the receiving compartment 130 by means of the locking mechanism 137a, 137b and, once the locking mechanism 137a, 137b has been released manually, is pushed by the arms 139a, 139b, under the action of the spring 134, out of the receiving compartment 130 into the outer end position.

FIGS. 26 to 29 illustrate a ninth embodiment of the storage device.

The umbrella holder 145 is mounted in the receiving compartment 140 to pivot by way of the two vertical axles 150a, 150b.

The lifting device 146 is articulatedly mounted in the umbrella holder 145 by way of the horizontal turning axle 147.

The lifting device 146 is quiver-shaped in cross-section and has in its rear portion an opening 146a that is accessible from above, through which the umbrella 147 can be inserted into the lifting device 146 or removed therefrom.

The length of the lifting device 146 is reduced relative to the length of the umbrella holder 145 by such a distance that the handle 147a of an inserted umbrella 147' lies outside the lifting device 146.

The lifting device 146 is extended beyond the turning axle 147 and is provided with a control arm 148 which is urged, under the action of the lifting spring 151, onto the control cam 149 that is arranged on the base wall 140a of the receiving compartment 140 concentrically with the axles 150a, 150b.

As a result, in the inner end position, the lifting device 146 is pressed against the force of the lifting spring 151 against the base wall 145a of the umbrella holder 145 and the umbrella 147' is held inside the umbrella holder 145.

As the umbrella holder 145 pivots out from the inner to the outer end position, the control arm 148 moves downwards, following the falling control cam 149, under the action of the lifting spring 151.

As a result, the lifting device 146 is raised so far that the handle 147a of the umbrella 147' projects beyond the umbrella holder 145 and can be grasped readily.

On pivoting back to the inner end position, the control arm 148 is raised on the control cam 149 and as a result the lifting device 146, together with the umbrella 147, is lowered into the umbrella holder 145.

That manner of construction too enables a shallow installation depth of the storage device.

Figure 30:
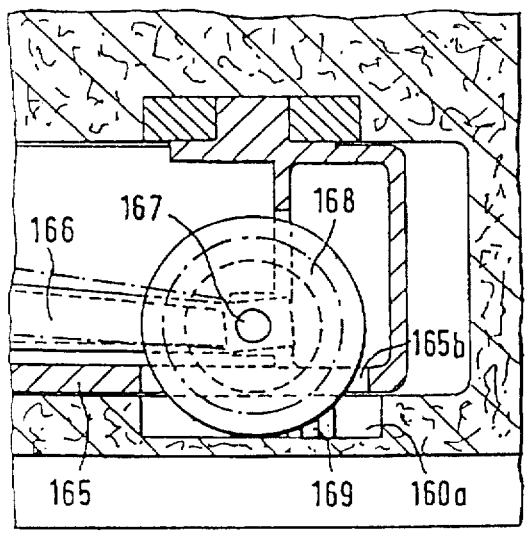
FIG. 30 is a detail view, in longitudinal section, of a tenth embodiment of the storage device with the umbrella holder in the inner end position.
Figure 31:
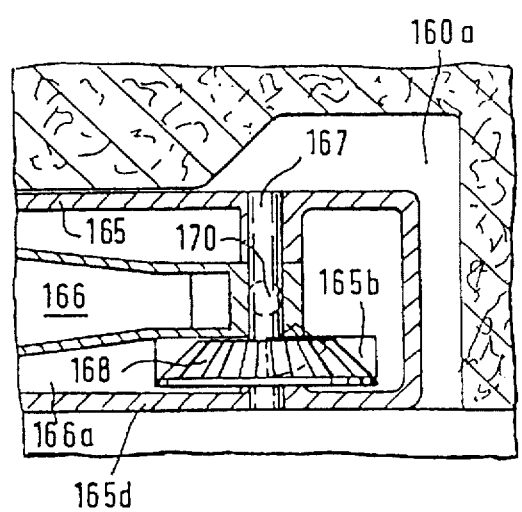
FIG. 31 is a plan view according to the drawing in FIG. 30.

FIGS. 30 and 31 describe a further embodiment of the storage device which corresponds substantially to the manner of construction of the embodiment illustrated in FIGS. 26 to 29.

Instead of a control arm that raises or lowers the lifting device by way of a control cam, in that construction mechanically driven control is provided.

On the turning axle 167 that is mounted horizontally in the umbrella holder 165 and is fixedly connected to the lifting device 166, the bevel wheel 168 which is likewise fixedly connected to the turning axle 167 is arranged on the side that faces the cover 165d.

Provided in the base wall 165a of the umbrella holder 165 is an opening 165b, through which the bevel wheel 168 projects and meshes with a bevel wheel segment 169 that is arranged on the base wall 160a of the receiving compartment 160 concentrically with the vertical axle 170 of the umbrella holder 165.

By means of that mechanically driven control the lifting device 166 is raised and lowered in dependence on the direction of rotation of the umbrella holder 165.

I claim:

1. Storage device for umbrellas, for installation in motor vehicles, having a receiving compartment (3, 30, 31, 60, 70, 80, 110, 130, 140, 160) that is arranged in a vehicle door (1, 10', 61, 71, 100, 131) and an umbrella holder (4, 40, 50, 65, 75, 85, 115, 135, 145, 165) that is movably connected thereto, for receiving an umbrella (9, 91, 76, 86, 147'), the umbrella holder (4, 40, 50, 65, 75, 85, 115, 135, 145, 165) being movable between an inner end position, in which the umbrella (9, 91, 76, 86, 147') is substantially enclosed in the receiving compartment (3, 30, 31, 60, 70, 80, 110, 130, 140, 160), and an outer end position, in which the umbrella (9, 91, 76, 86, 147') can be removed from the umbrella holder (4, 40, 50, 65, 75, 85, 115, 135, 145, 165) and inserted therein, means (10, 11, 12, 13, 134) are provided that move the umbrella holder (4, 40, 50, 65, 75, 85, 115, 135, 145, 165) from the inner to the outer end position, said means including a spring (12, 134) under whose action the umbrella holder (4, 40, 50, 65, 75, 85, 115, 135, 145, 165) is moved from the inner to the outer end position, a manually releasable locking mechanism (14a, 14b, 137a, 137b) that holds the umbrella holder (4, 40, 50, 65, 75, 85, 115, 135, 145, 165), in the receiving compartment and also means (15, 17) are provided that move the umbrella holder (4, 40, 50, 65, 75, 85, 115, 135, 145, 165) from the outer to the inner end position as the vehicle door (10', 61, 71, 100, 131) closes and that include a driver member (15) arranged on the umbrella holder (4) and also a stop (17) arranged on a door sill (16).

2. Storage device according to claim 1, characterized in that the receiving compartment (3, 30, 31, 60, 70, 80, 110, 130, 140, 160) is arranged in a hollow area of the vehicle door (1, 10', 61, 71, 100, 131), which hollow area is formed between an outer wall (1a) and an inner panel (2) of the vehicle door.

3. Storage device according to claim 1, characterized in that the receiving compartment (3, 30, 31, 60, 70, 80, 110, 130, 140, 160) is arranged in a lower region of the vehicle door (1, 10', 61, 71, 100, 131) and extends with a longitudinal axis substantially parallel with a lower, horizontal longitudinal edge of the vehicle door (1, 10', 61, 71, 100, 131).

4. Storage device according to claim 1, characterized in that the receiving compartment (3, 30, 31, 60, 70, 80, 110, 130, 140, 160) is arranged in the rear region of the vehicle door (1, 10', 61, 71, 100, 131) and extends with a longitudinal axis substantially parallel with the rear, vertical closing edge of the vehicle door (1, 10', 61, 71, 100, 131).

5. Storage device according to claim 1, characterized in that the umbrella holder (4, 40, 50, 65, 75, 85, 115, 135, 145, 165) is articulatedly mounted in the receiving compartment (3, 30, 31, 60, 70, 80, 110, 130, 140, 160) by means of a turning axle (5a, 5b, 150a, 150b, 112, 87a, 87b, 133).

6. Storage device according to claim 5, characterized in that the turning axle (5a, 5b, 150a, 150b, 133) runs substantially transversely to the longitudinal axis of an umbrella (9, 90, 91, 138, 147') inserted in the umbrella holder (4, 40, 50, 136, 145).

7. Storage device according to claim 5, characterized in that the turning axle (87a, 87b, 112) runs substantially parallel with the longitudinal axis of an umbrella (86, 118) inserted in the umbrella holder (85, 115).

8. Storage device according to claim 7, characterized in that the umbrella holder (85) is articulatedly mounted on the receiving compartment (80) in the region of the lower horizontal longitudinal edge of the cover (85d).

9. Storage device according to claim 7, characterized in that the umbrella holder (115) is articulatedly mounted on the receiving compartment (110) in the region of a vertical longitudinal edge (121) of the cover (117).

10. Storage device according to claim 6, characterized in that the turning axle (5a, 5b, 150a, 150b) is arranged in a region of a front end wall (4f), in the direction of travel, of the umbrella holder (4, 145).

11. Storage device according to claim 6, characterized in that the umbrella holder (135) is articulatedly mounted on the receiving compartment (130) in the region of the lower horizontal transverse edge (136b) of the cover (136).

12. Storage device according to claim 1, characterized in that the umbrella holder (65, 75) is connected to the receiving compartment (60, 70) by way of parallelogram guides (62a, 62b, 72a, 72b, 73a, 73b).

13. Storage device according to claim 12, characterized in that the parallelogram guide arms (62a, 62b) are articulatedly mounted, on the one hand, on the base wall (60a) of the receiving compartment (60) and, on the other hand, on the base wall (65a) of the umbrella holder (65).

14. Storage device according to claim 12, characterized in that the parallelogram guide arms (72a, 72b, 73a, 73b) are articulatedly mounted, at one side, on the side end walls (70e, 70f) of the receiving compartment (70) and, on the other side, on the side end walls (75e, 75f) of the umbrella holder (75).

15. Storage device according to claim 1, characterized in that the movement of the umbrella holder (4, 40, 50, 65, 75, 85, 115, 135, 145, 165) from the inner to the outer end position is effected substantially towards the inside of the vehicle.

16. Storage device according to claim 1, characterized in that the umbrella holder (4, 40, 50, 65, 75, 85, 115, 135, 145, 165) is, in the outer end position, open and freely accessible on an upper side (4b) for the insertion and removal of an umbrella (9, 91, 76, 86, 147').

17. Storage device according to claim 1, characterized in that means (41a, 41b, 40e, 41, 42, 44, 51, 52, 51a, 51b, 55, 119, 136, 135a, 135b, 135c, 139, 139a, 139b, 134, 146, 148, 149, 151, 168, 169) are provided on the umbrella holder (40, 50, 115, 135, 145) that render the handle (90a, 91a, 118, 138, 147a) of an inserted umbrella (90, 91, 147') freely accessible in the outer end position.

18. Storage device according to claim 17, characterized in that the means include supports (41, 116, 117, 120) for the umbrella (90) and the walls (41a, 41b, 40e, 119) of the umbrella holder (40, 135) are set back in the region of the umbrella handle (90, 118).

19. Storage device according to claim 18, characterized in that the cover (40d, 50d, 136) of the umbrella holder (40, 50, 135) is open in the region of the umbrella handle (90a, 91a, 138).

20. Storage device according to claim 19, characterized in that, in the inner end position, the opening is covered by means of a movable flap (42, 52, 139).

21. Storage device according to claim 20, characterized in that the flap (42, 52, 139) is arranged on the umbrella holder (40, 50, 135).

22. Storage device according to claim 21, characterized in that control means (42a, 44, 51, 51a, 51b, 55, 139a, 139b, 134) are provided that move the flaps (42, 52, 139) in dependence on the position of the umbrella holder (40, 50, 135).

23. Storage device according to claim 1, characterized in that a collecting arrangement (6, 7, 180, 186, 77, 77a, 78, 79) for a drip water from a wet umbrella (9, 91, 76, 86, 147') is arranged in the umbrella holder (4, 40, 50, 65, 75, 85, 115, 135, 145, 165) and/or in the receiving compartment (3, 30, 31, 60, 70, 80, 110, 130, 140, 160).

24. Storage device according to claim 23, characterized in that the collecting arrangement includes a collecting channel (6, 77) that is arranged underneath the umbrella (9, 91, 76, 86, 147') and in which the drip water is caught and taken to a drain pipe (7, 77a, 79).

25. Storage device according to claim 24, characterized in that the collecting channel (6, 77) is arranged in the umbrella holder (4, 75).

26. Storage device according to claim 25, characterized in that a closing valve (78) is arranged on the drain pipe (77a) of the collecting channel (6, 77).

27. Storage device according to claim 26, characterized in that the closing valve (78) is open in one end position of the umbrella holder (75) and is closed in the other end position of the umbrella holder (75).

28. Storage device according to claim 23, characterized in that the collecting arrangement includes a water drain (7, 18a, 18b, 79) that is arranged in the region of a underside (1b) of the vehicle door (1).

29. Storage device according to claim 28, characterized in that parts of the collecting arrangement (6, 77, 77a, 78) are arranged on the umbrella holder (4, 75) and connecting means (7, 18a, 78) are provided that take the drip water to the water drain (18b, 79).

30. Storage device according to claim 28, characterized in that, as the vehicle door (1) opens, the water drain (7, 18a, 18b, 79) is moved outwards beyond the door sill (16) to an outside.

31. Storage device according to claim 30, characterized in that the water drain (7, 79) is provided with a closing valve (18a, 18b) which is opened and closed by the movement of the vehicle door (1) or by the relative movement between the receiving compartment (3, 70) and the umbrella holder (4, 75).

32. Storage device according to claim 5, characterized in that an drain pipe (7) is arranged concentrically in the turning axle (5b).

33. Storage device according to claim 24, characterized in that umbrella supports (8a, 8b) are provided that keep the umbrella (9) at a distance from the collecting channel (6, 77).

34. Storage device according to claim 1, characterized in that a fan (20) is arranged in the umbrella holder (4, 40, 50, 65, 75, 85, 115, 135, 145, 165) for ventilating the inside of the umbrella holder (4, 40, 50, 65, 75, 85, 115, 135, 145, 165).

35. Storage device according to claim 34, characterized in that the fan (20) is separated from the inside of the umbrella holder (4) by a ventilating grille (21).

36. Storage device according to claim 34, characterized in that the air provided for ventilation is heated by means of a heating device (23).

37. Storage device according to claim 34, in that the fan (20) is activated on insertion of an umbrella (9).

38. Storage device according to claim 1, characterized in that ventilation slots (24) are arranged on the umbrella holder (4, 40, 50, 65, 75, 85, 115, 135, 145, 165).

39. Storage device, especially for umbrellas, for installation in motor vehicles, having a receiving compartment (3, 30, 31, 60, 70, 80, 110, 130, 140, 160) that is arranged in the vehicle door (1, 10', 61, 71, 100, 131) and an umbrella holder (4, 40, 50, 65, 75, 85, 100, 131) and an umbrella holder (4, 40, 50, 65, 75, 85, 115, 135, 145, 165) that is movably connected thereto, for receiving an umbrella (9, 91, 76, 86, 147'), the umbrella holder (4, 40, 50, 65, 75, 85, 115, 135, 145, 165) being movable between an inner end position, in which the umbrella (9, 91, 76, 86, 147') is substantially enclosed in the receiving compartment (3, 30, 31, 60, 70, 80, 110, 130, 140, 160), and an outer end position, in which the umbrella (9, 91, 76, 86, 147') can be removed from the umbrella holder (4, 40, 50, 65, 75, 85, 115, 135, 145, 165) and inserted therein, the umbrella holder (4, 40, 50, 65, 75, 85, 115, 135, 145, 165) is provided with a cover (4d, 40d, 41b, 42, 50d, 52, 85d, 117, 136, 165d) that, in the inner end position, closes the receiving compartment (3, 30, 31, 60, 70, 80, 110, 130, 140, 160), movable insertion aids (51, 52) are arranged on the umbrella holder (50) that facilitate the insertion of the umbrella (91) into the umbrella holder (50) in the outer end position, and control means (51, 51a, 51b, 55) are provided that move the insertion aids (51, 52) in dependence on the position of the umbrella holder (50).

40. Storage device, especially for umbrellas, for installation in motor vehicles, having a receiving compartment (3, 30, 31, 60, 70, 80, 110, 130, 140, 160) that is arranged in the vehicle door (1, 10', 61, 71, 100, 131) and an umbrella holder (4, 40, 50, 65, 75, 85, 100, 131) and an umbrella holder (4, 40, 50, 65, 75, 85, 115, 135, 145, 165) that is movably connected thereto, for receiving an umbrella (9, 91, 76, 86, 147'), the umbrella holder (4, 40, 50, 65, 75, 85, 115, 135, 145, 165) being movable between an inner end position, in which the umbrella (9, 91, 76, 86, 147') is substantially enclosed in the receiving compartment (3, 30, 31, 60, 70, 80, 110, 130, 140, 160), and an outer end position, in which the umbrella (9, 91, 76, 86, 147') can be removed from the umbrella holder (4, 40, 50, 65, 75, 85, 115, 135, 145, 165) and inserted therein, a lifting device (146, 166) is arranged on the umbrella holder (145, 165), which lifting device (146, 166) lifts the umbrella handle (147a) in the outer end position, and a control device (148, 149, 151, 168, 169) is provided that raises and lowers the lifting device (146, 166) in dependence on the position of the umbrella holder (145, 165).

* * * * *